United States Patent
Norton et al.

(10) Patent No.: US 11,764,974 B2
(45) Date of Patent: *Sep. 19, 2023

(54) METHOD AND SYSTEM FOR CERTIFICATION AND AUTHENTICATION OF OBJECTS

(71) Applicant: Verisart, Inc., Los Angeles, CA (US)

(72) Inventors: Robert Norton, Los Angeles, CA (US); Bradford Lindsley Schlei, Santa Monica, CA (US); Shelley Ann Mannion, London (GB); John Wood, London (GB); Marcus Ramsden, London (GB)

(73) Assignee: Verisart, Inc., Los Angeles, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 17/384,432

(22) Filed: Jul. 23, 2021

(65) Prior Publication Data
US 2022/0239495 A1 Jul. 28, 2022

Related U.S. Application Data

(63) Continuation-in-part of application No. 17/156,163, filed on Jan. 22, 2021, now Pat. No. 11,075,766.

(51) Int. Cl.
*H04L 9/32* (2006.01)
*H04L 9/08* (2006.01)
*H04L 9/00* (2022.01)

(52) U.S. Cl.
CPC .......... *H04L 9/3247* (2013.01); *H04L 9/0825* (2013.01); *H04L 9/0872* (2013.01); *H04L 9/3242* (2013.01); *H04L 9/3297* (2013.01); *H04L 9/50* (2022.05); *H04L 2209/56* (2013.01)

(58) Field of Classification Search
CPC ... H04L 9/3247; H04L 9/0825; H04L 9/0872; H04L 9/3242; H04L 9/3297; H04L 9/50; H04L 2209/56; H04L 63/0838; H04L 2463/121; H04L 9/0861; H04L 9/0891; H04L 9/3239; H04L 9/3268; H04L 63/062; H04L 63/0823; G06Q 30/018
See application file for complete search history.

(56) References Cited

U.S. PATENT DOCUMENTS

| 6,856,977 | B1 * | 2/2005 | Adelsbach | G06Q 30/06 713/176 |
|---|---|---|---|---|
| 11,075,766 | B1 * | 7/2021 | Norton | H04L 9/0819 |
| 2007/0185765 | A1 * | 8/2007 | Radcliffe | G06Q 30/02 705/14.27 |
| 2017/0346833 | A1 * | 11/2017 | Zhang | G06F 16/951 |

(Continued)

OTHER PUBLICATIONS

Karapapas et al, "Fully Decentralized Trading Games with Evolvable Characters using NFTs and IPFS", 2021, Athens University of Economics and Business, p. 1-2.*

(Continued)

*Primary Examiner* — Christopher A Revak
(74) *Attorney, Agent, or Firm* — Clause Eight; Michael Catania

(57) ABSTRACT

A method and system for certification and authentication of objects is disclosed herein. The method and system use multiple attestations along with digital ledger technology to provide a digital certificate of authenticity for an object such as a work of art, collectible, or a non-fungible token (NFT).

18 Claims, 38 Drawing Sheets

(56) References Cited

U.S. PATENT DOCUMENTS

| | | | | |
|---|---|---|---|---|
| 2018/0374173 | A1* | 12/2018 | Chen | G06Q 10/10 |
| 2019/0180371 | A1* | 6/2019 | Benkert | H04L 9/3263 |
| 2019/0253256 | A1* | 8/2019 | Saab | G06Q 20/02 |
| 2019/0279204 | A1* | 9/2019 | Norton | G06Q 20/389 |
| 2020/0213117 | A1* | 7/2020 | Resch | H04L 9/3268 |
| 2020/0218830 | A1* | 7/2020 | Topart | H04L 9/30 |
| 2021/0089514 | A1* | 3/2021 | Werner | G06F 21/64 |
| 2021/0377052 | A1* | 12/2021 | Brown | H04L 9/50 |
| 2022/0210061 | A1* | 6/2022 | Simu | G06Q 20/3829 |
| 2023/0139878 | A1* | 5/2023 | Clark | H04L 9/3263 |
| | | | | 713/157 |

OTHER PUBLICATIONS

Rajendran et al, "PKI Ecosystem for Reliable Smart Contracts and NFT", no date provided, Cyber Security Group, p. 1-5.*

Venugopal et al, "NFT for Collectibles", 2023, International Conference on Nascent Technologies in Engineering, p. 1-5.*

Zhao et al, "NFTCert: NFT-Based Certificates With Online Payment Gateway", 2021, IEEE International Conference on Blockchain, p. 538-543.*

Ismail et al, "TRABAC: A Tokenized Role-Attribute Based Access Control using Smart Contract for Supply Chain Applications", 2021, IEEE International Conference on Blockchain, p. 584-589.*

* cited by examiner

Details

Issuer
Vide Atelier Studio

Issuer Note
This edition is verified by Vide Atelier, a project to help artists during Covid-19 by DACS, Marcel for Art and Verisart

Another Field
Vide Atelier Studio, London, UK

Files

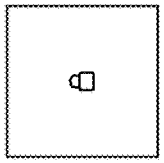

Condition Report    Private

Notes

This edition is verified by Vide Atelier, a project to help artists during Covid-19 by DACS, Marcel for Art and Verisart. An electric match is a device that uses an externally applied electric current to ignite a combustible compound. This image is a collage of three photographs depicting an electric match at the moment of ignition in the centre.

HISTORY

Edited
JUN 20 2020

Certificate edited by the owner. The following fields were modified:

Owner
My shopify Shop
myshopifyshop.com

FIG. 5B

Title
Golden Future

Dimensions
58 x 88 in

Medium
Mixed media (stencil, silkscreen and collage) on canvas

Terms
Transfer restricted until Dec 21 2021

Note
This edition is verified by Vide Atelier, a project to help artists during Covid-19 by DACS, Marcel for Art and Verisart. Notes can potnetially be long Files
Front   Back   Detail   Detail   Condition report Hide Details

VERIFIED ON THE BLOCKCHAIN ON JUN 20 2020 10:35:53 UTC

OWNER KEY
02368182B26FAD84A64CC82150EAC5AC2CCA5

ADDRESS
00000000000000093951198b79039279 26af

Created
FEB 1 2020

FIG. 5C

HISTORY

2020

Edited
20 JUN

UPDATES ❶

My shopify Shop
myshopifyshop.com

Title
My amazing painting

Dimensions
32 x 32 cm

Medium
Oil on canvas

Issuer Note
This edition is verified by Vide Atelier, a project to help artists during Covid-19 by DACS, Marcel for Art and Versart

Files

Front

Back          Detail          Detail

Condition Report

Notes

This edition is verified by Vide Atelier, a project to help artists during Covid-19 by DACS, Marcel for Art and Verisart

HISTORY

| 2020 | Edited 20 JUN |  |
| | Created 1 FEB |  |

METHOD AND SYSTEM FOR CERTIFICATION AND AUTHENTICATION OF OBJECTS

CROSS REFERENCE TO RELATED APPLICATION

The Present application is a continuation-in-part application of U.S. patent application Ser. No. 17/156,163, filed on Jan. 22, 2021, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates generally to the documentation of the provenance and title of artifacts, as well as commerce involving such artifacts. More specifically, the present invention relates to the application of digital ledger technology to document and verify claims about objects, and the application of smart contracts to facilitate commerce involving objects, like non-fungible tokens.

Description of the Related Art

There is a need in the field of art and other artifacts to verifiably record sources, characteristics, and actions. For example, a gallery or collector of artifacts has a need to be able to verify and prove the provenance of an artifact, such as a work of art, so as to establish its authenticity and value. Traditionally, such verifications have been established via trusted, ad hoc relationships and documents, such as expert certifications. Such evidences take varied forms, can be lost or forged, and generally require considerable effort to manage and verify.

With the advent of distributed ledgers and blockchains, a decentralized, fault-tolerant solution is available that allows pieces of information to be nearly indelibly recorded in a verifiable fashion. In combination with public key cryptography used to sign information, a distributed ledger allows verified pieces of information to be recorded indefinitely for common access and verification.

The well-known art of public key cryptography, combined with a robust system for identification, allows the association of identified entities with authenticated information.

Wide availability of blockchain implementations enables their use for a wide variety of applications in the field of artifacts, such as works of art, as well as more generally for the purposes of authentication, tracking, ownership documentation, and contract enforcement. Ownership and ownership transfer can be recorded indelibly on a blockchain using an agreed-upon data format. A blockchain can be used to record and verify documentation of expert appraisals or evaluations, product transportation or transformations, and any of a variety of other actions that may occur during the lifetime of a work of art or other item. Such records can then be used as reliable information for inspections, supply chain verification, insurance purposes, etc.

The foregoing applications come under the heading of "smart contracts," or contracts recorded, verified, and/or enforced, partially or in full, using blockchain records and associated programs implemented and enforced by the blockchain implementation. An additional feature of some blockchain implementations is cryptocurrency, ownership of which is accounted on the blockchain and controlled by the blockchain implementation's algorithms. Such cryptocurrency may be used as a factor in smart contract implementation and enforcement.

Other fields where these technologies have similar application are logistics and manufacturing, museum curation, archaeology, brand verification, online sales, vehicle sales, and real estate.

The prior art discusses the following:

General definitions for terms utilized in the pertinent art are set forth below.

Block of a blockchain is generally defined as a list of transactions recorded into a digital ledger over a set period of time.

Blockchain is generally defined as a data structure to generate a digital ledger of data that is shared with a network of independent members. A Public blockchain is a distributed network run through a native token and is open for all to participate at all levels with an open-source code maintained by the participants. A Permissioned Blockchain a distributed network run through a native token with control roles that are performed by members within the network. A Private Blockchain is a small network without a token, and which are controlled by the membership.

Chain of a blockchain is a hash that links one block to another block, mathematically linking them together to generate trust.

Cryptocurrency is digital currency such as BITCOIN, ETHEREUM (ETH), or others, designed to work as an exchange medium with cryptographic protection to secure a transaction.

Network of a blockchain is composed of full nodes that contain a complete record of all of the truncations that were ever recorded in the blockchain.

A non-fungible token ("NFT") is a digital asset stored on a blockchain that established that the digital asset is unique and not interchangeable.

There is a need for a robust means of recording and verifying the creator of an artifact, such as a work of art.

BRIEF SUMMARY OF THE INVENTION

The present invention takes advantage of the blockchain and cryptographic state of the art to implement a robust means of recording and verifying the creator of artifact, its ownership, transfer of ownership, the condition of the artifact as evaluated by a third party, and various other actions and conditions connected to the artifact. A creator can be artist, an originator, a manufacturer, a writer, a sculptor, a developer, an architect, and the like.

Individual parties connected to the work of art are represented by a public-private key pair—the private key held secret by the party or on behalf of the party and used to sign information using standard techniques of public key cryptography, and the public key used for signature verification.

One aspect of the present invention is a method for creating a digital certificate and/or a digital certificate of authenticity (COA) for a non-fungible token (NFT). The method includes transmitting from a server to a user a digital key. The method also includes receiving a request from a user for a relationship with a creator of a NFT. The method also includes establishing a registered record for the NFT. The method also includes authorizing a relationship between the user and the creator subsequent to verification of the user. The method also includes generating a creator relationship digital key at the server. The method also includes converting the registered record to a digital COA with a confirmation using the creator relationship digital key. The digital COA is based upon a plurality of authentication endorsements and is configured to change state along a continuum of low to high confidence in authenticity based on the plurality of authentication endorsements. Each of the plurality of authentication endorsements are weighted differently, and an authentication endorsement from the creator of the NFT is weighted greater than an authentication endorsement from a third-party.

The method further includes creating a random one-time code at the server. The method further includes generating a secure computer readable code comprising the random one-time code, for attachment of the computer readable code to the NFT. The method further includes linking the random one-time code in a database to the digital COA.

The method further includes receiving a request from a user for a relationship with a third-party of the NFT. The method further includes authorizing a relationship between the user and the third-party. The method further includes generating an endorsement digital key at the server. The method further includes modifying the digital COA with an inclusion of the endorsement digital key.

Another aspect of the present invention is a non-transitory computer-readable medium that stores a program that causes a processor to generate a digital certificate of authenticity (COA) for a NFT by executing the following steps: transmitting from a server to a user a digital key; receiving a request from a user for a relationship with a creator of a collectible object; establishing a registered record for the NFT; authorizing a relationship between the user and the creator subsequent to verification of the user; generating a creator relationship digital key at the server; and converting the registered record to a digital COA with a confirmation using the digital creator relationship key. The digital COA is based upon a plurality of authentication endorsements and is configured to change state along a continuum of low to high confidence in authenticity based on the plurality of authentication endorsements. Each of the plurality of authentication endorsements are weighted differently, and an authentication endorsement from the creator of the NFT is weighted greater than an authentication endorsement from a third-party.

Yet another aspect of the present invention is a digital certificate of authenticity (COA) for a NFT comprising a verified user's digital key for a user, a creator's relationship digital key confirming a relationship between the user and a creator for the NFT, a completeness of collectible information comprising an image, and an active link between the digital COA and the NFT. The digital COA is based upon a plurality of authentication endorsements and is configured to change state along a continuum of low to high confidence in authenticity based on the plurality of authentication endorsements. Each of the plurality of authentication endorsements are weighted differently, and an authentication endorsement from the creator of the NFT is weighted greater than an authentication endorsement from a third-party.

Yet another aspect of the present invention is a method for creating a digital certificate and/or a digital certificate of authenticity (COA) for an object. The method includes transmitting from a server to a user a digital key. The method also includes receiving a request from a user for a relationship with a creator of a collectible object. The method also includes establishing a registered record for the object. The method also includes authorizing a relationship between the user and the creator subsequent to verification of the user. The method also includes generating a creator relationship digital key at the server. The method also includes converting the registered record to a digital COA with a confirmation using the digital creator relationship key.

The method further includes creating a random one-time code at the server. The method further includes generating a secure computer readable code comprising the random one-time code, for attachment of the computer readable code to the object. The method further includes linking the random one-time code in a database to the digital COA.

The secure computer readable code is at least one of a QR code, a hologram, a RFID, a BLUETOOTH beacon, a BLUETOOTH-transmitted code, a wireless beacon, a wirelessly transmitted code, a 2D barcode, a 3D barcode, an embedded visual watermark in the artwork, or metadata on a digital file.

The method further includes receiving a request from a user for a relationship with a third-party of the object. The method further includes authorizing a relationship between the user and the third-party. The method further includes generating an endorsement digital key at the server. The method further includes modifying the digital COA with an inclusion of the endorsement digital key.

Another aspect of the present invention is a non-transitory computer-readable medium that stores a program that causes a processor to generate a digital certificate of authenticity (COA) for a collectible object by executing the following steps: transmitting from a server to a user a digital key; receiving a request from a user for a relationship with a creator of a collectible object; establishing a registered record for the collectible object; authorizing a relationship between the user and the creator subsequent to verification of the user; generating a creator relationship digital key at the server; and converting the registered record to a digital COA with a confirmation using the digital creator relationship key.

Yet another aspect of the present invention is a digital certificate of authenticity (COA) for a collectible object comprising a verified user's digital key for a user, a creator's relationship digital key confirming a relationship between the user and a creator for the collectible object, a completeness of collectible information comprising an image, and an active link between the digital COA and the collectible object.

The objects are physical collectable objects, unique individually identifiable articles created or manufactured in sequence, numbered, name branded, or digital collectable objects that exist in the real world or virtual world including virtual reality and augmented reality. Attestations by a creator, an existing owner, a trusted third-party, manufacturers, or buyers or sellers on title transfer, combined with evidence of ownership or fractional ownership or transfer of title, are used to document and authenticate ownership and title history to the object through a link with the digital COA.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL
VIEWS OF THE DRAWINGS

FIG. 5B is a continuation of the sample digital certificate presented on a website shown in FIG. 5A.

FIG. 5C is a continuation of the sample digital certificate presented on a website shown in FIGS. 5A and 5B.

FIG. 12 is an illustration of a digital COA.

FIG. 12A is a continuation of the illustration of FIG. 12.

DETAILED DESCRIPTION OF THE INVENTION

Figure 1:
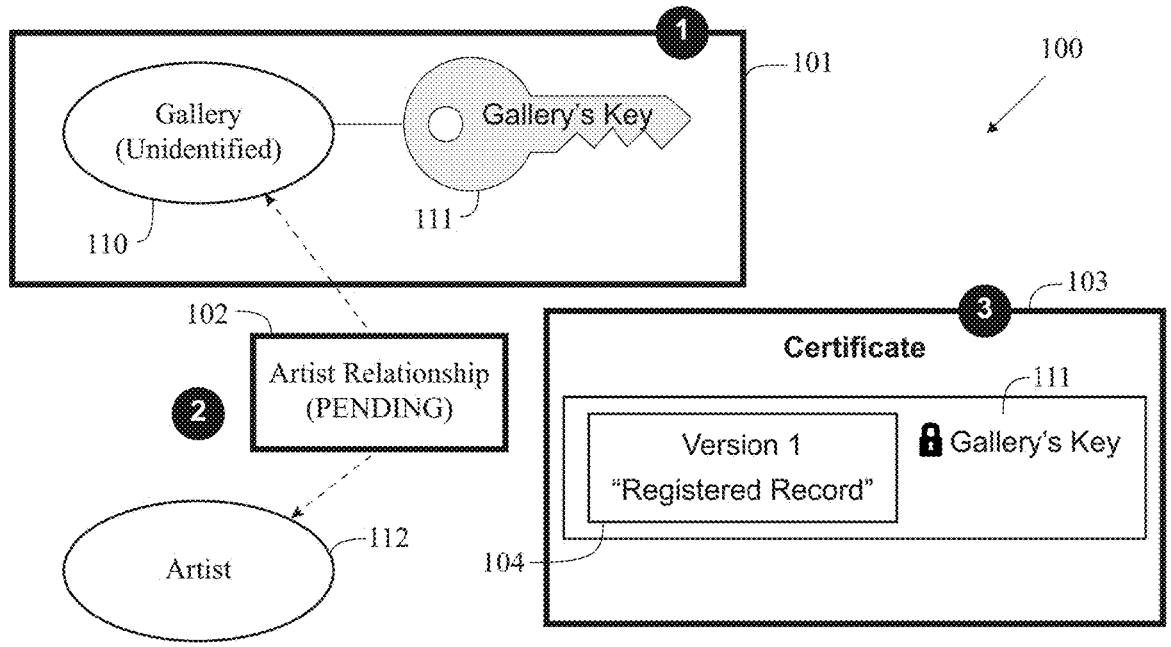
FIG. 1 is a block diagram for the use of cryptographic keys to authenticate attestations for a collectible object.

Attestations, signed by the attesting party's private key or a key derived therefrom, are generated, hashed using a standard cryptographic hashing algorithm, timestamped, and recorded on a blockchain. An attestation may be a claim of authorship by the artwork's creator, a claim of ownership by a buyer and/or seller, a report of the artwork's condition or authenticity by an expert, a record of relocation made by an owner or caretaker, or any number of other possible claims regarding the work. An attestation may also be a confirmation of an existing attestation by an additional party. Multiple attestations may be chained, producing a picture of information regarding the work, when combined, with a greater or lesser degree of completeness and verification.

Additionally, individual parties and attestations may be assigned confidence or trust levels. For an individual party, such an assignation would indicate the trustworthiness of that party's attestations. These confidence levels may be combined in the case of multiple attestation or endorsement, weighting individual attestations to produce an aggregate confidence level for a given attestation or series of attestations.

A combined set of attestations about a given work of art is combined into a certificate, presenting all recorded information about the work along with an overall confidence level and confidence levels for individual attestations. These may be presented in a user-readable format much like a traditional paper certificate.

Computer readable codes such as QR codes or other encoding devices may be used to record and present relevant information about a work of art, such as its authorship, in a verifiable fashion, in a time-limited fashion to prevent forgery.

One of the applications of the present invention is as a decentralized title registry. Attestations by existing owners, trusted third parties, or by buyers or sellers on title transfer, combined with evidence of ownership or transfer of title, may be used to document and authenticate ownership and title history. Further, attestations may be used to record and account for fractional ownership of individual works or pools of works.

Smart contracts may be used in a related fashion, to enforce title and contractual obligations regarding a work of art. For example, title transfer may be assisted and enforced using smart contracts. Cryptocurrency or integration with an existing financial service provider may be used as provision in a smart contract to ensure payment when title is transferred or to enforce a penalty for a falsified attestation or non-delivery of the physical work of art.

The verified attestations and smart contracts of the present invention may be used to facilitate and secure e-commerce, allowing buyers and sellers to increase confidence by authenticating claims about products for sale and enforcing contractual obligations. The user establishes an account with an authentication provider by accessing an authentication server through a website, a mobile application (native or SHOPIFY), or other account process. The authentication server generates a gallery (user) key.

FIG. 1 is a block diagram 100 for the use of cryptographic keys to authenticate attestations for an object such as a work of art. A user 110, such as a gallery, wants to request artist authorization from an artist (creator) 112 of the work of art to create a digital COA. Then at block 102, the gallery 110 initiates a request with the authentication server for a relationship with the artist 112 of the work of art. At this point, version 1, the gallery creates a certificate 103 that has only a registered record 104 and the gallery key 111. This is not yet a digital COA.

Figure 1A:
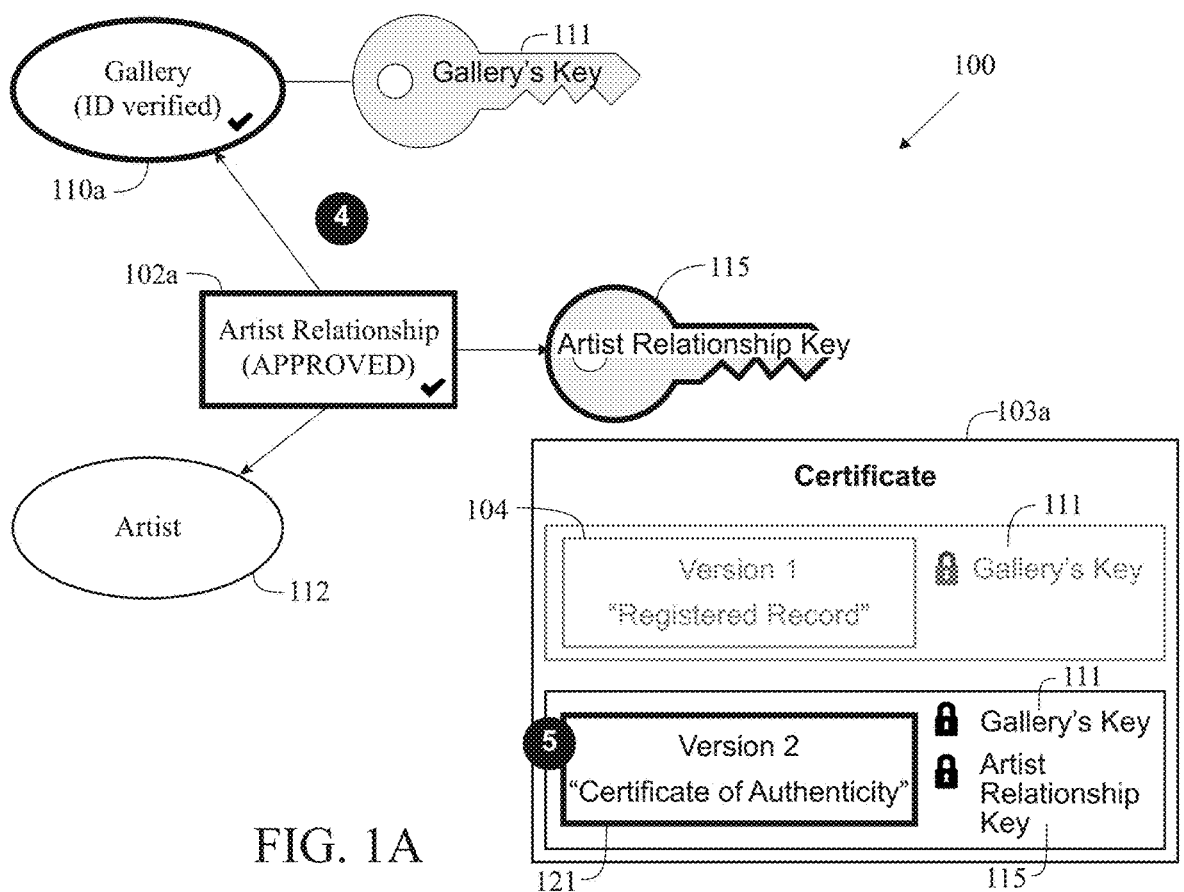
FIG. 1A is a block diagram for the use of cryptographic keys to authenticate attestations for a collectible object.

FIG. 1A is a block diagram 100a for the use of cryptographic keys to authenticate attestations for an object. The authentication server has identified and verified the gallery 110a and the rights of the gallery to have an artist (creator) relationship. At block 102a, the server has approved the artist relationship between the gallery 110a and the artist 112. The authentication server generates an artist relationship key 115. The certificate 103a, in version 2, is a digital COA 121 and includes the gallery digital key 111 and the artist relationship digital key 115.

Figure 1B:
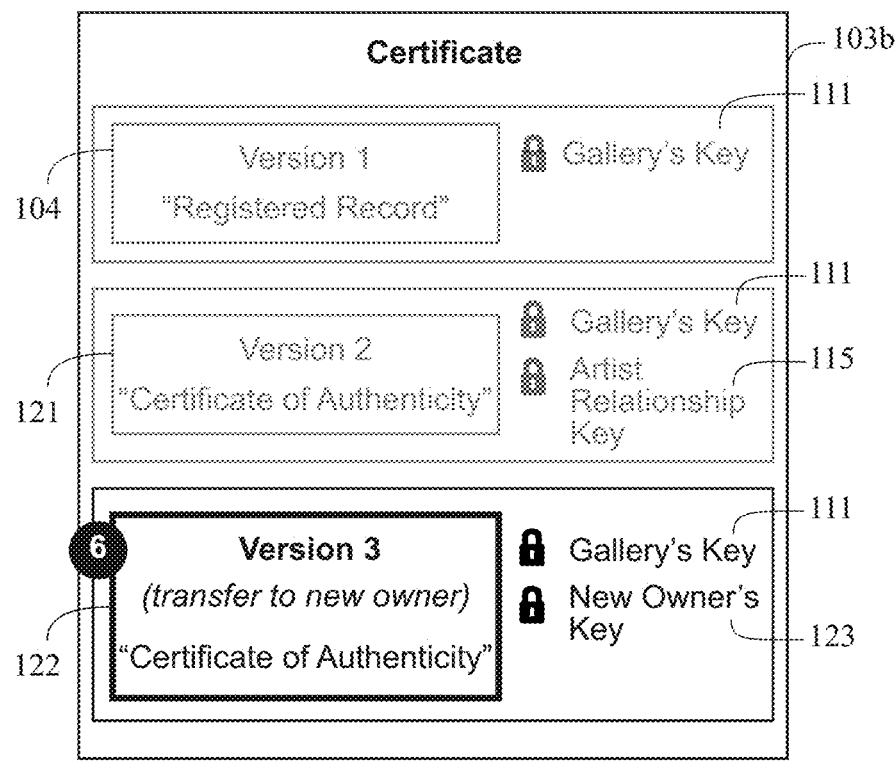
FIG. 1B is a block diagram of a digital COA for a collectible object.

FIG. 1B is a block diagram demonstrating a transfer of the object and the digital COA 103b for the object. Changes to the certificate 103b are not signed by the artist. The digital COA 122, version 3, includes the transfer to the new owner with the gallery digital key 111 and the new owner's digital key 123.

Figure 1C:
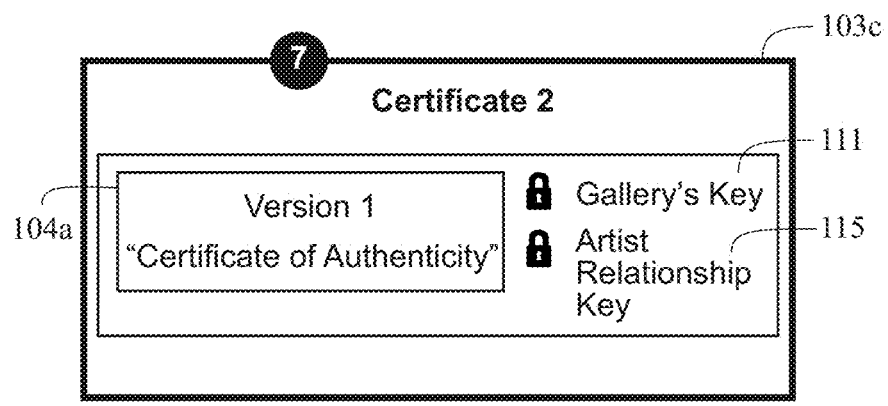
FIG. 1C is a block diagram of a digital COA for a collectible object.

As shown in FIG. 1C, all future certificates are digital COAs for objects. Once the certificate is a digital COA 103c, further certificates created by the gallery 110a for the artist 112 are preferably immediately digital COAs and no further modification or approval from the authentication server is necessary.

Figure 1D:
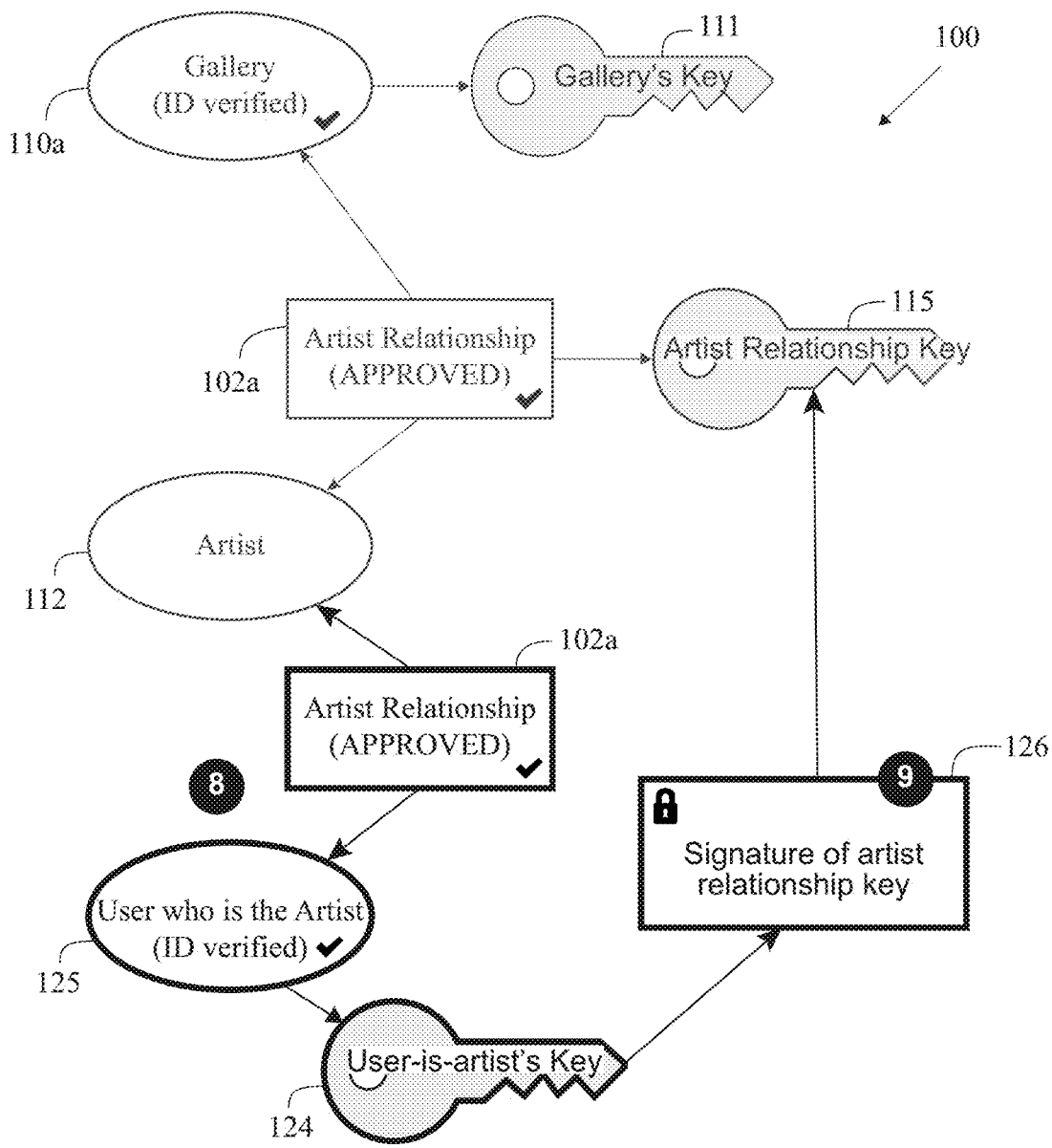
FIG. 1D is a block diagram for the use of cryptographic keys to authenticate attestations for a collectible object.

FIG. 1D is a block diagram 100d showing that a user can claim the artist record at a later date. At a later time, a user can claim the artist (and also claim control of the relationship and the relationship digital key). This requires the authentication server, at block 102a to verify the identity of the user 125 and authorize claiming control of the relationship and the relationship digital key 124. At block 126, a signature of the artist relationship digital key with expiry metadata is constructed at the authentication server to further assert the relationship.

Figure 1E:
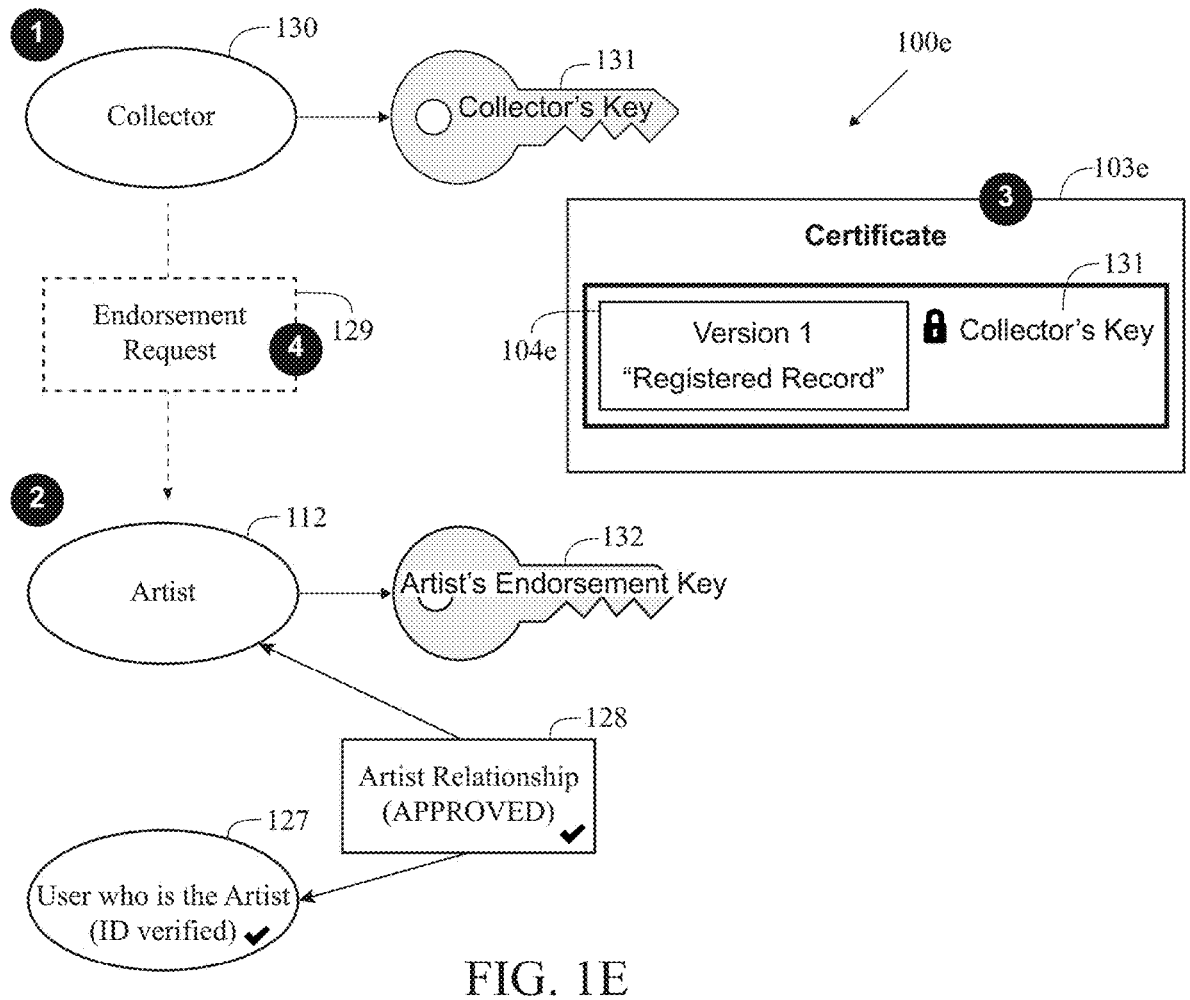
FIG. 1E is a block diagram for the use of cryptographic keys to authenticate attestations for a collectible object.

FIG. 1E is a block diagram 100e of a collector requesting an endorsement of the collectible object from the artist. A collector's digital key 131 is generated for a collector 130. The artist 112 is a user 127 and an artist relationship 128 has been approved by the authentication server. The authentication server has already generated an artist's endorsement digital key 132. The collector 130 generates a certificate 103e, version 1, which includes a registered record 104e with the collector's digital key 131. At block 129, the collector 130 requests an endorsement from the artist 112.

Figure 1F:
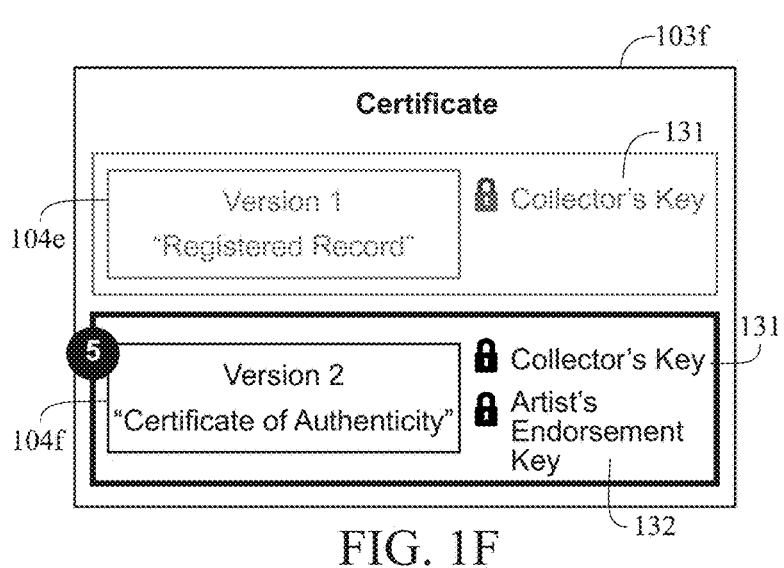
FIG. 1F is a block diagram of a digital COA for a collectible object.

FIG. 1F is a block diagram 100f of an artist approving an endorsement request. The certificate 103f, after endorsement by the artist, is a digital COA 104f and includes the collector's digital key 131 and the artist's endorsement digital key 132.

Figure 1G:
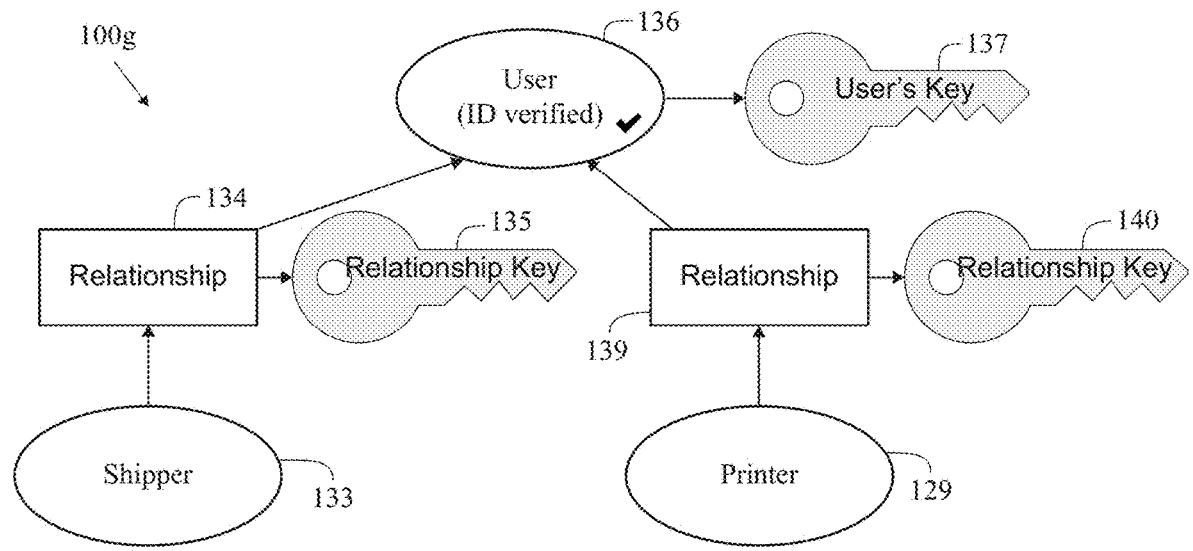
FIG. 1G is a block diagram for the use of cryptographic keys to authenticate attestations for a collectible object.

FIG. 1G is a block diagram 100g of other relationships for the object. Such relationships include but are not limited to a shipper 133 of the object and a printer 138 of the object. Those skilled in the pertinent art will recognize other relationships that can exist for the object without departing from the scope and spirit of the invention. At block 134, the shipper 133 requests a relationship with the user 136 for shipping the object and a relationship digital key 135 is generated for the relationship between the user 136 and the shipper 133. At block 139, the printer 138 requests a relationship with the user 136 for printing of the object and a relationship digital key 140 is generated for the relationship between the user 136 and the printer 138.

Figure 1H:
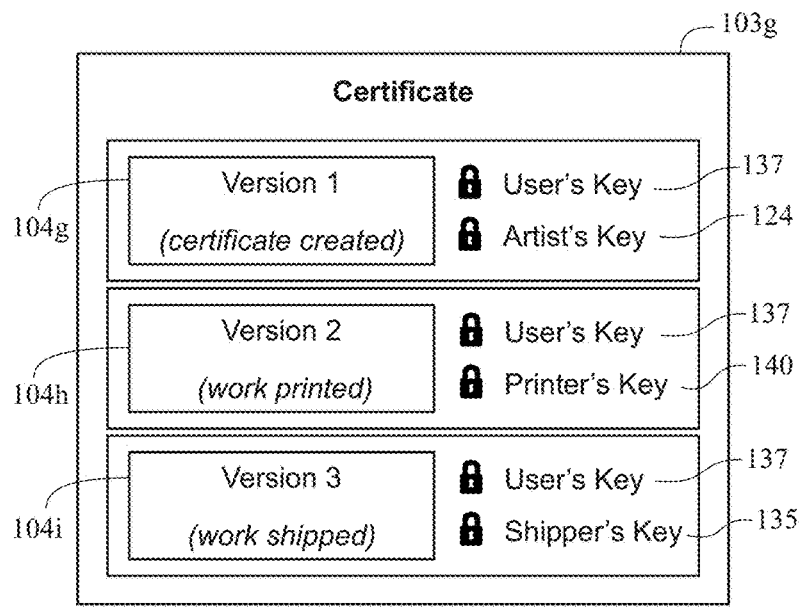
FIG. 1H is a block diagram of a digital COA for a collectible object.

FIG. 1H is a block diagram of a digital COA 103g for an object. The digital COA 103g includes a version 1 104g when the certificate was created including a user digital key 137 and an artist digital key 124, a version 2 104h when the work was printed including the user's digital key 137 and the printer's digital key 140, and a version 3 104i when the object was shipped including the user's digital key 137 and the shipper's key 135.

Figure 2:
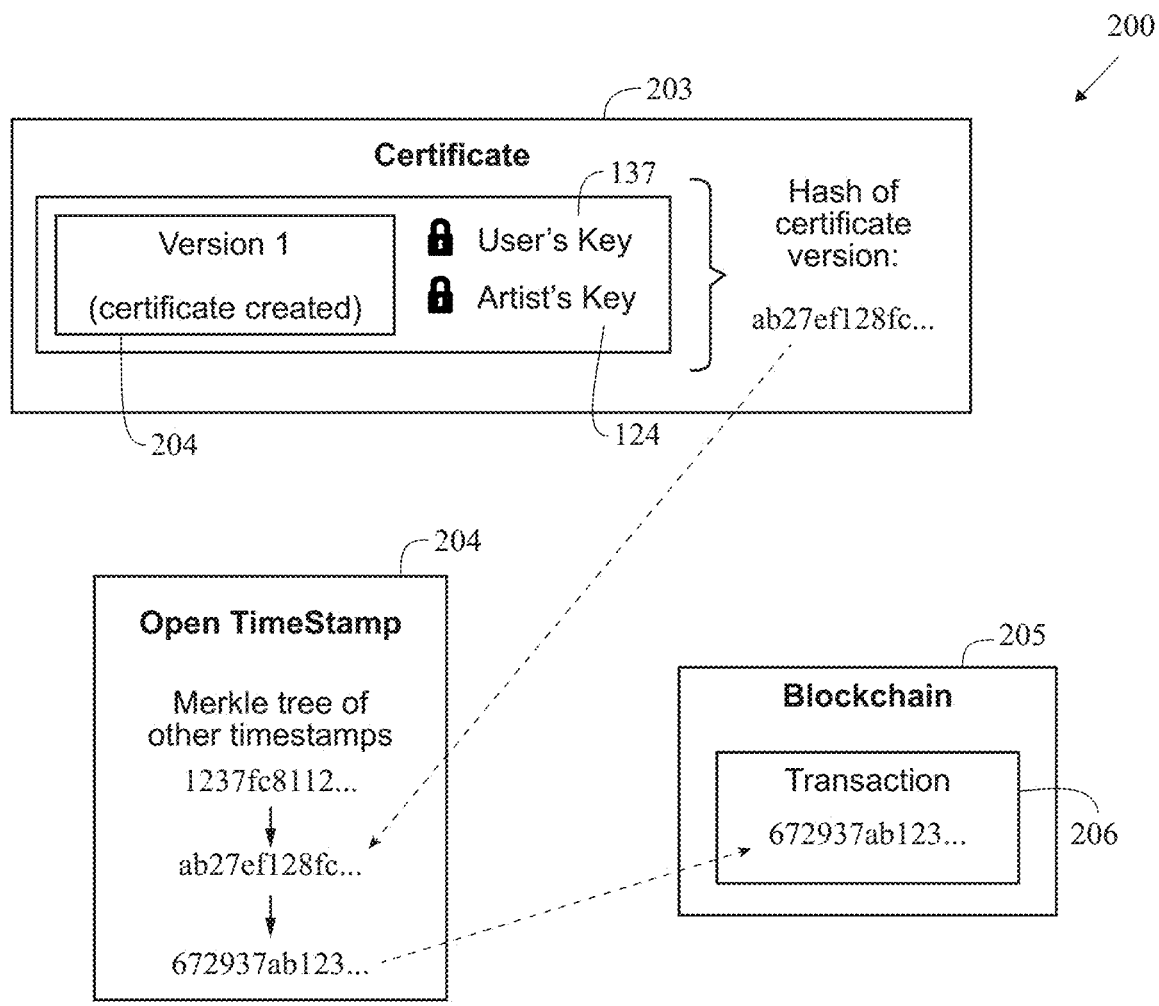
FIG. 2 illustrates a method used to record attestations on a blockchain.

FIG. 2 illustrates a method 200 used to record attestations on a digital ledger (blockchain). A full record of each version of a certificate is immutably stored in a digital ledger (such as a BITCOIN blockchain) preferably using time stamps (e.g., open timestamps) or a similar mechanism. At block 203, a hash of the certificate in a first version 204 including a user's digital key 137 and an artist digital key 124 is created. At block 204, the version of the certificate is timestamped. At block 205, a digital ledger 206 for the version of the certificate is generated.

Figure 3:
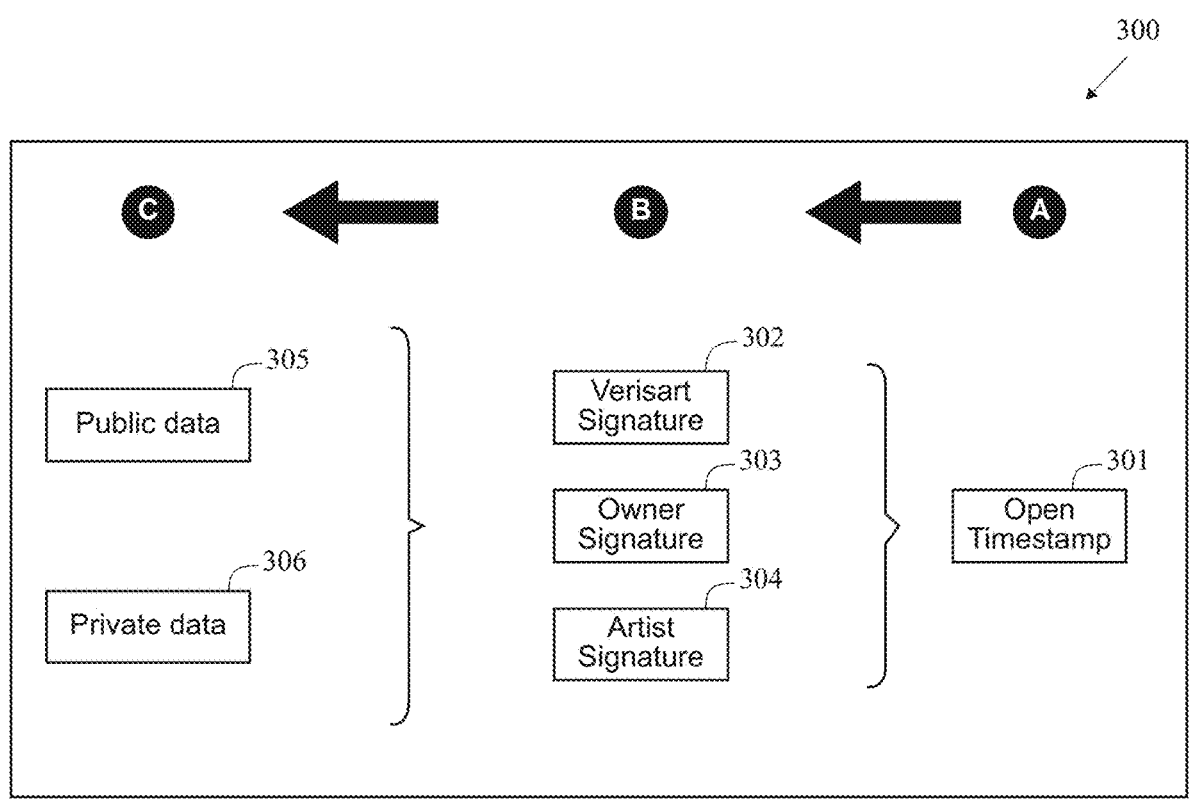
FIG. 3 illustrates a process used to verify attestations recorded on a blockchain.

FIG. 3 illustrates a process 300 used to verify attestations recorded on a digital ledger (blockchain). At step A, the certificate is checked by examining a public digital ledger (e.g., BITCOIN) transaction to verify the timestamp 301 of the certificate. This step provides confidence that the certificate was created before that time. At step B, the cryptographic signatures (authentication services 302, owner signature 303 and artist signature 304) are verified against public keys published on websites of artists, galleries, and/or an authentication service. This step provides confidence that the authentication service and the other associated parties attested to this version of the certificate. At step C, the contents (public data 305 and private data 306) of the certificate metadata and files are cryptographically verified by comparing the hashes against a main manifest file.

Figure 4:
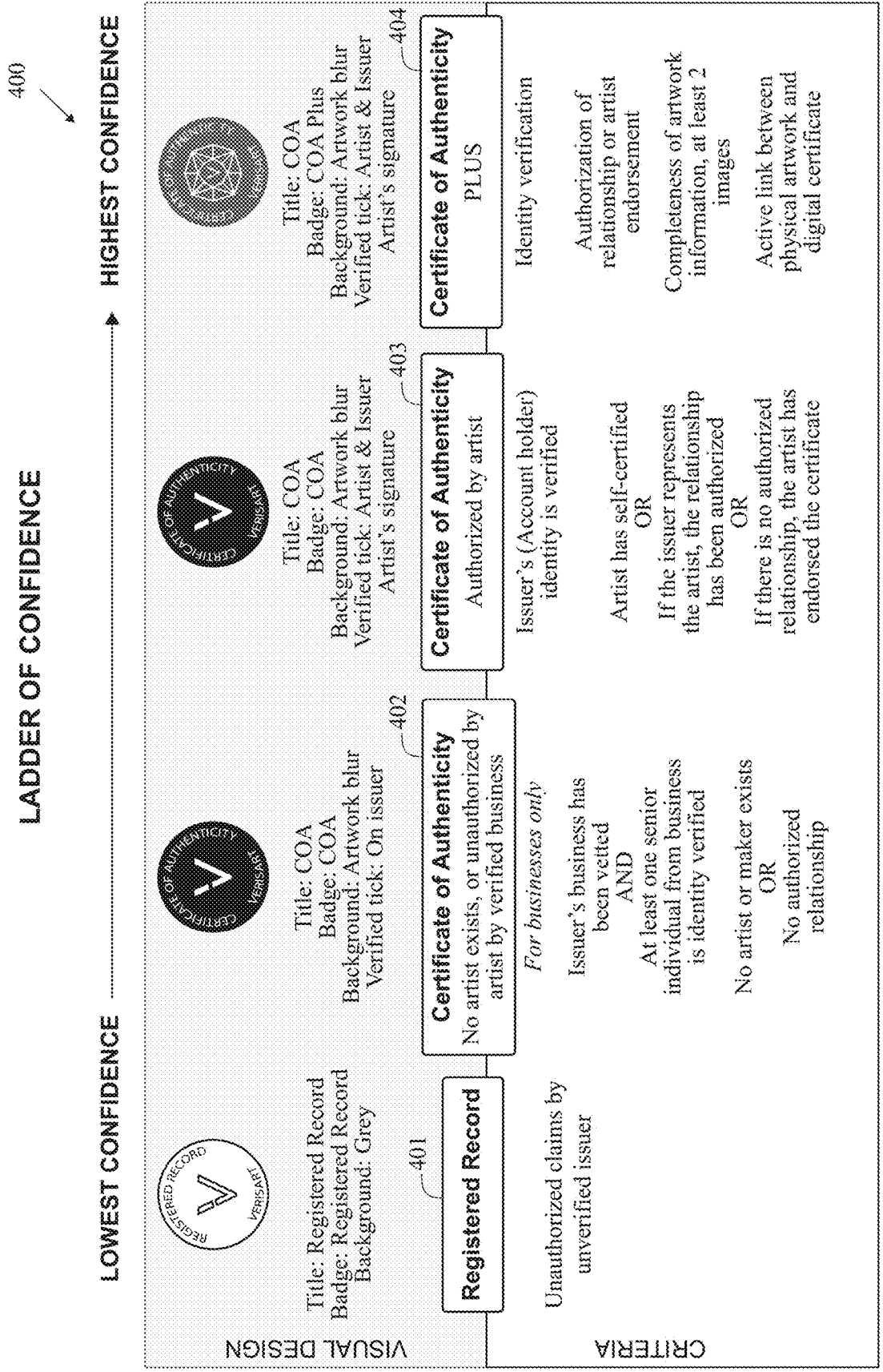
FIG. 4 illustrates a sample of confidence levels applied to individual attestations and certificates.

FIG. 4 illustrates a sample 400 of confidence levels applied to individual attestations and certificates. A registered record 401 is the lowest confidence level. A digital COA 402 where no artist exists or is unauthorized by an artist or by verified business is the next level. A digital COA 403 authorized by the artist is the next level. A digital COA plus 404 is the highest level of confidence.

When certificates change state, they move along a continuum of authenticity. Certificates move from left to right as they add proofs and gain credibility as a result of those proofs. In rare instances, a certificate may be downgraded or reverted to a lesser state if its authorization or endorsements are revoked or its proofs are shown to be false.

The authentication service defines three states for certificates depending on what criteria they meet. There are currently three states: Registered Record, Certificate of Authenticity and Certificate of Authenticity Plus. The requirements for these states are defined in the Ladder of Confidence. FIG. 4 shows the criteria for each state and how certificates are visually differentiated based on what state they have achieved. This visual differentiation is an important feature of the authentication service system; it helps viewers (often potential buyers) understand the trustworthiness of claims being made about an object. Note that these three states meet the needs of the initial implementation, but the states may change in the future and do not limit the scope of the invention. New states may also be added. The underlying and consistent principle is that certificates gain credibility by adding new proofs. The flexible framework that groups proofs, defines states and assigns names, is the Ladder of Confidence.

Registered Record

At the lowest rung of the Ladder is a Registered Record. It contains claims which are permanently registered on the blockchain through authentication service's system, but there is low confidence its authenticity because of the following. 1) It has not been authorized or endorsed by the artist or maker; creators themselves are the most reliable source of information about objects they've made. Without authorization or endorsement by them, claims of authenticity are weak. 2) The issuer's identity has not been verified. Without proof of the issuer's identity real-world identity, a specific individual cannot ultimately be held accountable for the claims. This is shown as column 1 in FIG. 4.

Certificate of Authenticity (COA)

The Certificate of Authenticity is the next level up from a Registered Record. It meets the minimum criteria for authenticity: 1) the artist or maker has authorized the issuer or endorsed the certificate; 2) the issuer's identity and credentials have been verified.

Authorization and endorsement demonstrate that the artist or maker confirms the physical or digital object was created by them and that the description of the object provided by the issuer (in many cases the artist or maker themselves) is accurate. Identity verification acts as a deterrent for actors making false claims by enabling the authentication service to hold named individuals accountable for the claims they make. This is shown as column 3 in FIG. 4.

In situations where there isn't a specific artist or maker, for example, manufactured items, software or other types of physical or digital projects, then the object's producer must meet certain requirements. The producer's business is vetted; the company's trading and registration details are checked. An owner or a senior-level representative of the business must be identity verified. This allows the producer to issue Certificates of Authenticity. This is shown as column 2 in FIG. 4.

There are exceptions where it is not possible for the artist or maker themselves to authorize or endorse. If they are no longer living, an estate, family member or another representative may be able to act on their behalf. In these situations, the authentication service reviews documentation to verify the representative's relationship to the artist or maker and determine if they are legally allowed to make such claims.

Certificate of Authenticity Plus (COA+)

Even after it meets the basic criteria of a Certificate of Authenticity, a certificate can continue to move up the Ladder through accumulating additional proofs.

There are two additional proofs required for the certificate to achieve COA Plus status: 1) the certificate includes at least 2 high-quality images of the physical or digital object; 2) a link has been established between the object and the digital certificate.

The requirement of at least two images addresses the completeness the digital record. Images are essential in determining authenticity and are often used by insurers and others as part of the process of indemnifying works. While the exact requirements for completeness may change over time and vary, depending on whether the work is physical or digital, the key principle is that the more descriptive information about the object is provided, the further along the continuum the certificate moves.

For physical objects, the issuer or owner needs to have established a link between the physical object and the digital certificate. There are many methods for doing this which the authentication service may use. The initial implementation will use secure computer-readable codes which are printed on physical labels and attached to the objects. Once these codes have been attached to the correct digital certificate, then the link is established, and the certificate moves up the Ladder. This type of link is less relevant for digital objects, where other methods will be used to establish the connection between the certified item and the certificate.

Figure 5:
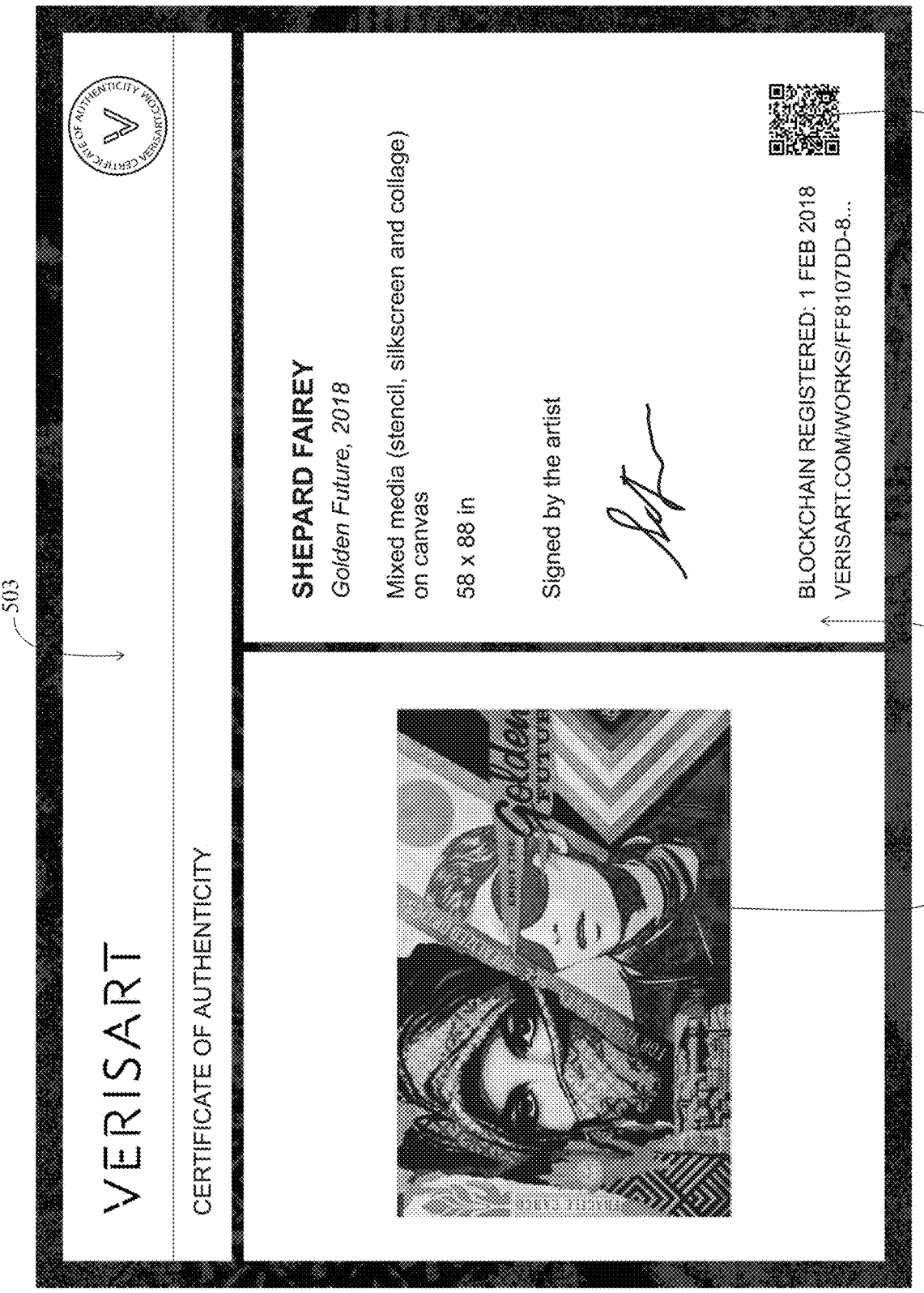
FIG. 5 illustrates a sample digital certificate presented to a user.
Figure 5A:
FIG. 5A illustrates a sample digital certificate presented on a website.
Figure 5D:
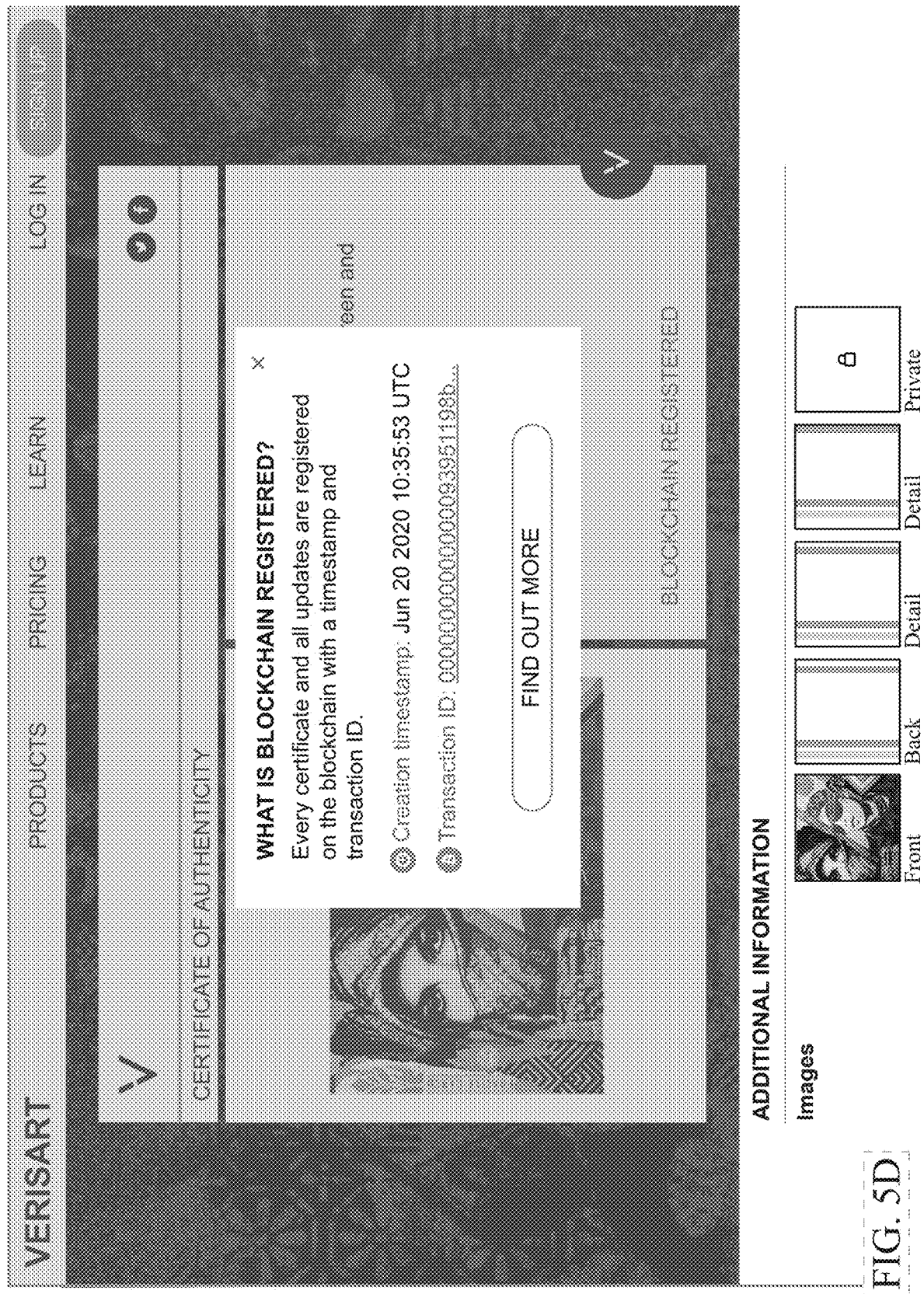
FIG. 5D illustrates a sample digital certificate presented on a website with a pop-up feature showing the digital ledger for the certificate.

FIG. 5 illustrates a sample certificate 500 presented to a user. The sample 500 includes a digital COA 503, data 504 for the collectible object, an image 505 of the collectible object, a QR code 506 and a uniform resource locator (URL). FIGS. 5, 5A, 5B and 5C illustrate a sample digital certificate presented on a website. FIG. 5D illustrates a sample digital certificate presented on a website with a pop-up feature showing a timestamp of the most recent certificate event, which in this case is a digital ledger registration for the certificate.

Figure 6:
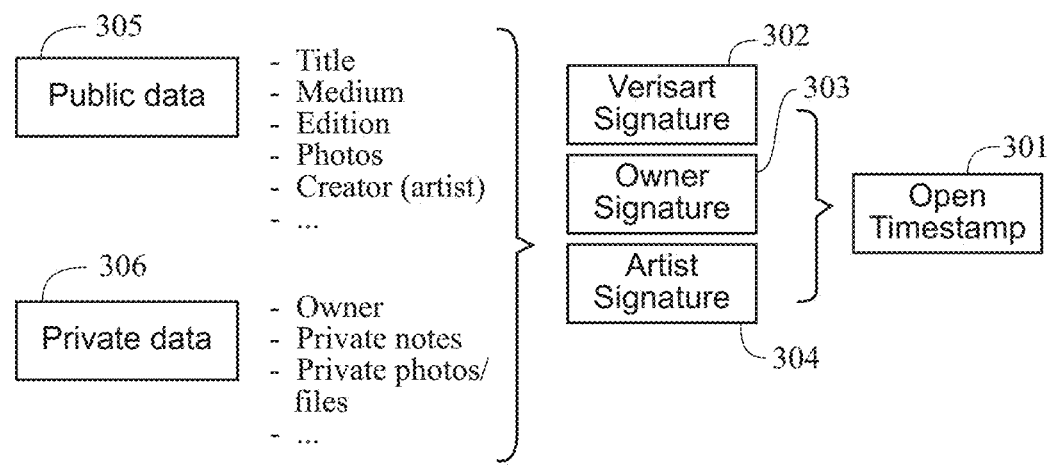
FIG. 6 is a block diagram of cryptographic integrity of certificates.

FIG. 6 is a block diagram 600 of cryptographic integrity of certificates. The certificate consists of multiple versions which represent the complete snapshot of the whole certificate at that point in time in the ownership of the collectible object. Each version is structured in a similar manner. At block 301, the timestamp proves a time of creation through a blockchain base timestamping service. Using public key cryptography, ownership and provenance is proved through digital signatures ((authentication services 302, owner signature 303 and artist signature 304). The public data is the title, medium, edition, photos and creator (artist). The private data 306 is the owner, private notes, private photos and private files.

Secure computer readable codes for object authentication used to strengthen the claim and link between the physical object and the digital certificate. Preferred secure computer readable codes are QR codes. Alternative secure computer readable codes include holograms, RFID, BLUETOOTH, wireless beacons, wireless transmitted codes, a 2D barcode, a 3D barcode, an embedded visual watermark in the artwork, or metadata on a digital file. Secure computer readable codes are used to enable additional security features regarding a collectible object's authenticity. The prior art uses VER-1044: download public QR labels in a PDF and simple URLs which can be generated by anyone. The present invention preferably uses secure self-print QR codes, bespoke printed QR codes+certificate, pre-printed QR codes with extra security features, or codes with a representation integrated into a substance of an object. All three approaches work essentially the same way: 1) create a random one-time code; 2) generate a QR code with this code included; 3) link the code in our database to the certificate; 4) ensure that this QR/code is not public; and 5) show extra visual reassurance when this code is seen in the wild.

Figure 7:
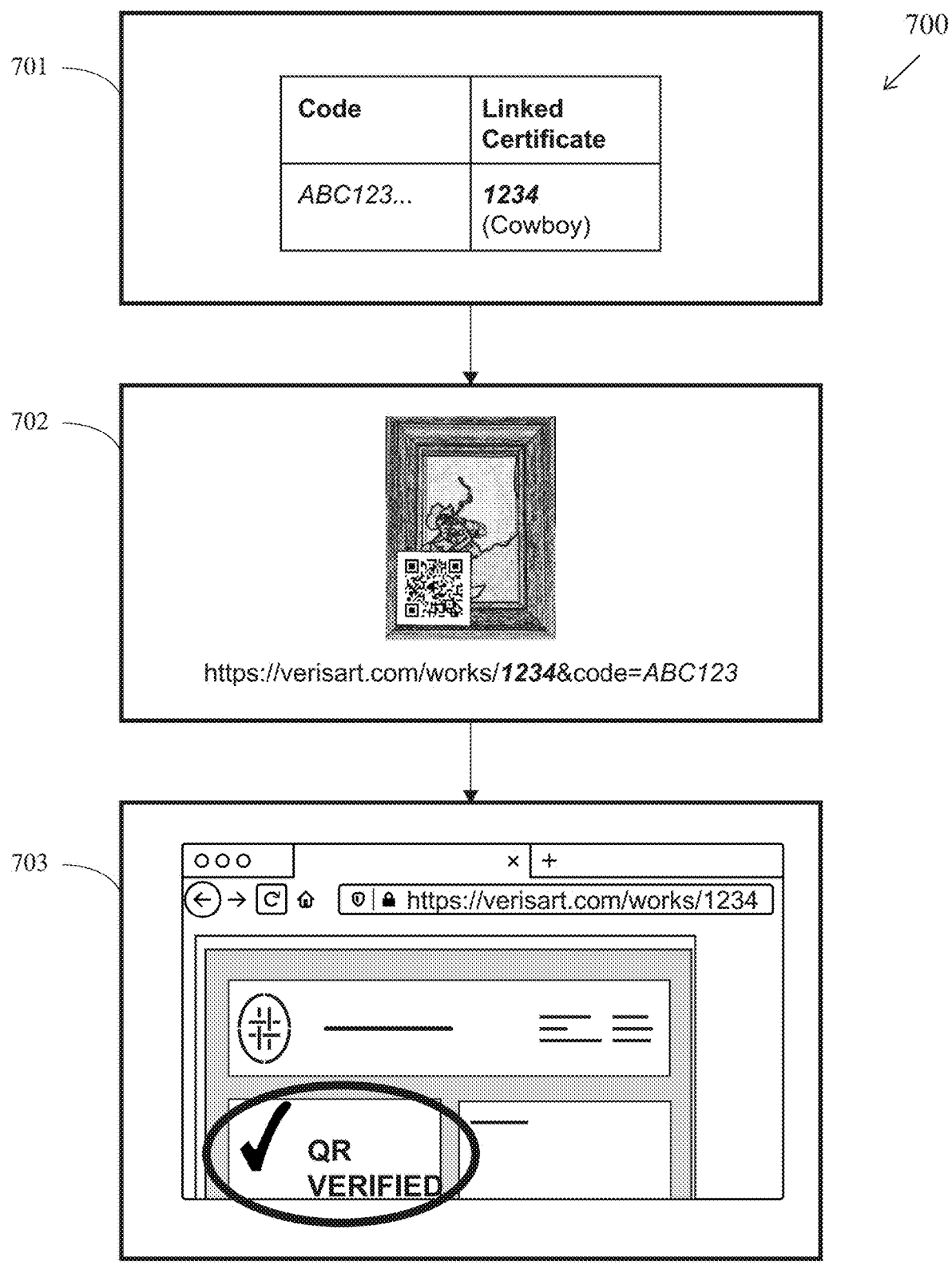
FIG. 7 is a block diagram of a secure self print process for printing a QR code for attachment to a collectible object.

FIG. 7 is a block diagram of a secure self print process 700 for printing a QR code for attachment to a collectible object. At block 701, a random code is generated and linked to certificate in database. At block 702, a user prints and attaches the QR code to the collectible object. At block 703, a third-party follows the QR code and sees an extra security "tick" if the code matches.

Figure 8:
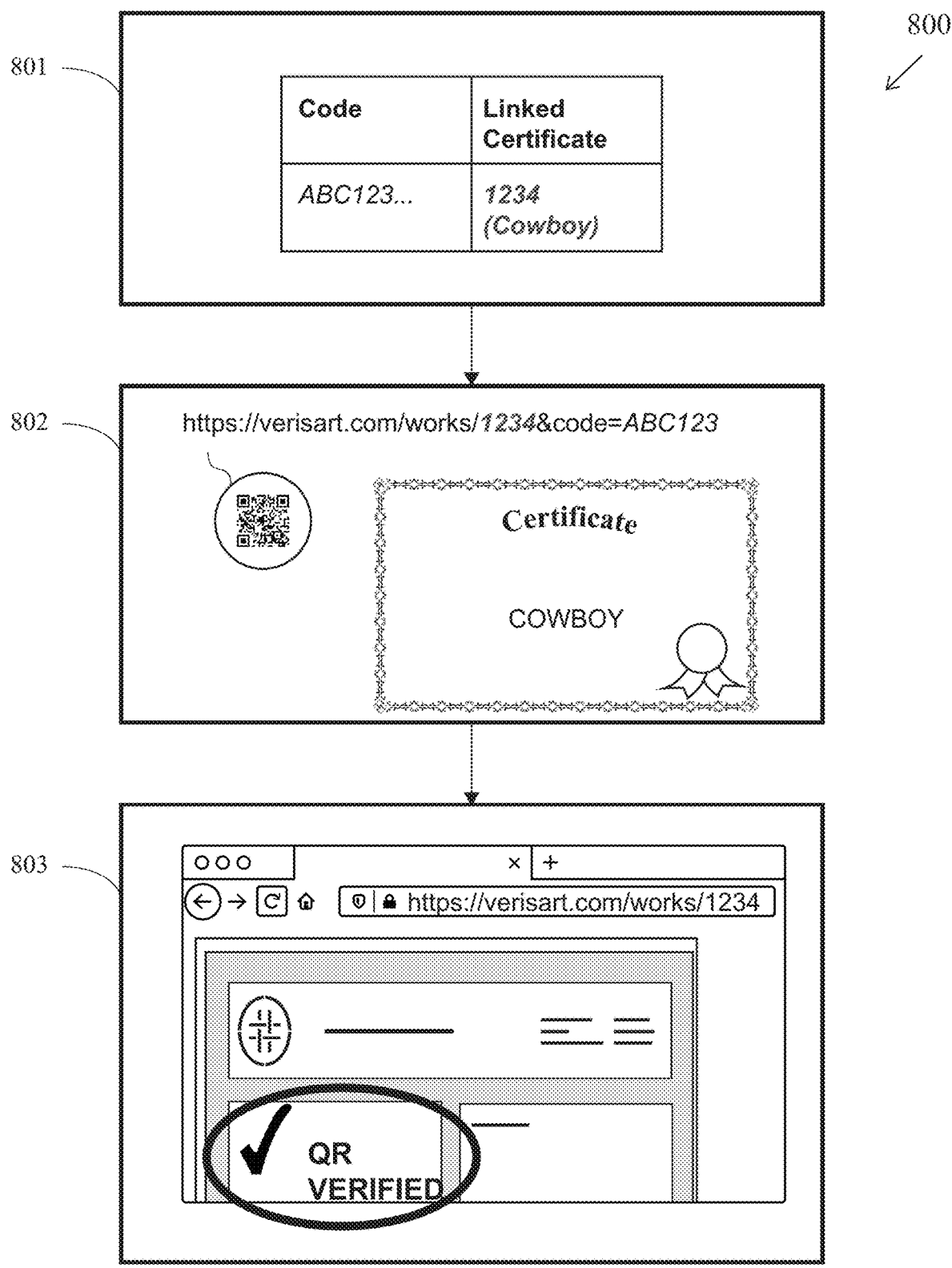
FIG. 8 is a block diagram of a secure bespoke process for printing a QR code for attachment to a collectible object.

FIG. 8 is a block diagram of a secure bespoke process 800 for printing a QR code for attachment to a collectible object. At block 801, a random code is generated and linked to a certificate in database. At block 802, the certificate and the QR label are posted to a user. At block 803, a third-party follows the QR and sees an extra security "tick" if the code matches. Under the Bespoke approach, the QR codes are printed bespoke for each certificate. The QR code is linked to a certificate before posting (which is similar to banks posting credit cards). The Bespoke approach is simple for the user (just stick on the product), allows attractive bespoke certificates, and provides more security features (e.g. watermarks, ribbons, holograms, etc). However, it is logistically complicated and there is a delay between certificate creation and getting the label code.

Figure 9:
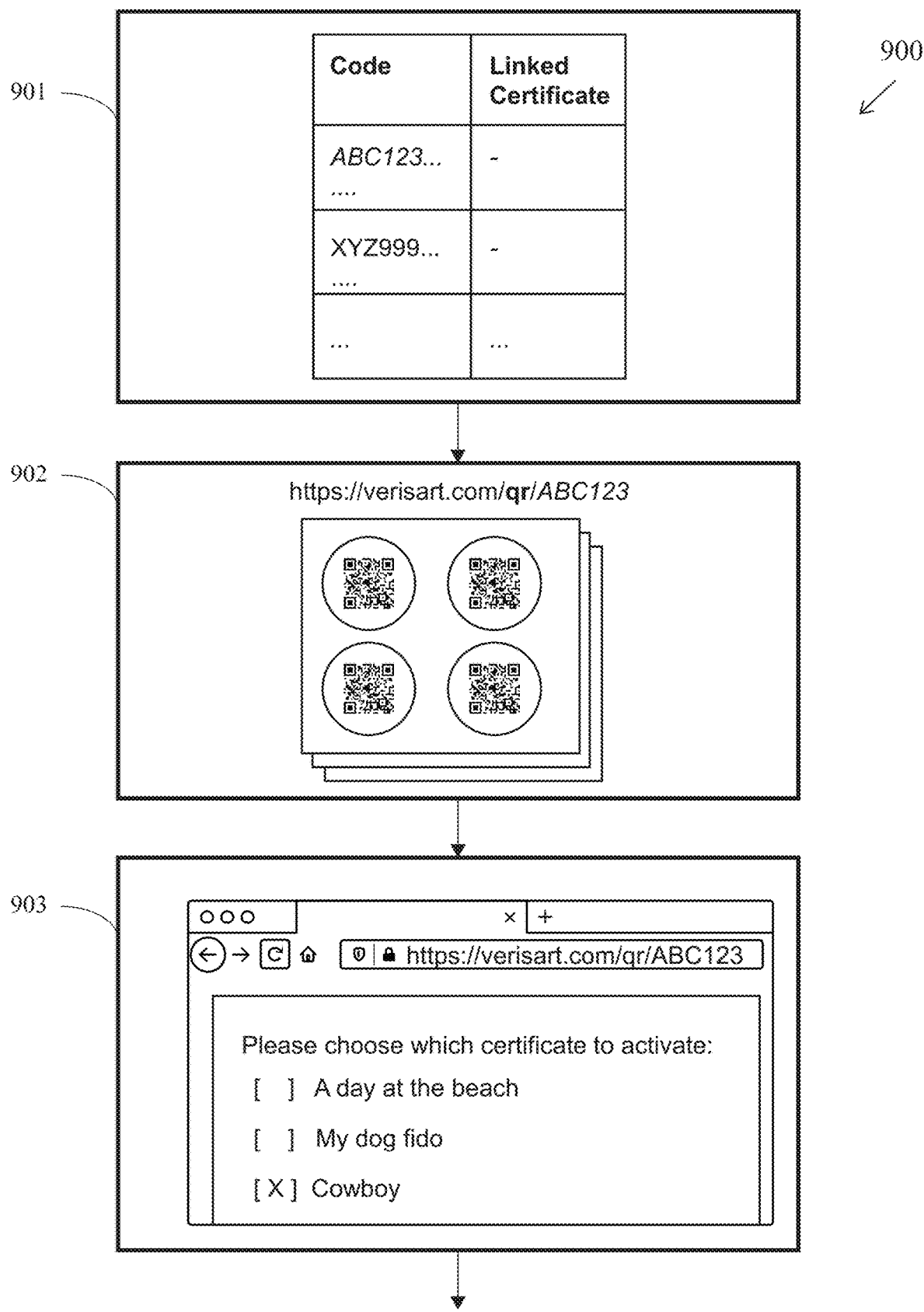
FIG. 9 is a block diagram of a secure pre-printed process for QR codes for attachment to a collectible object.
Figure 9A:
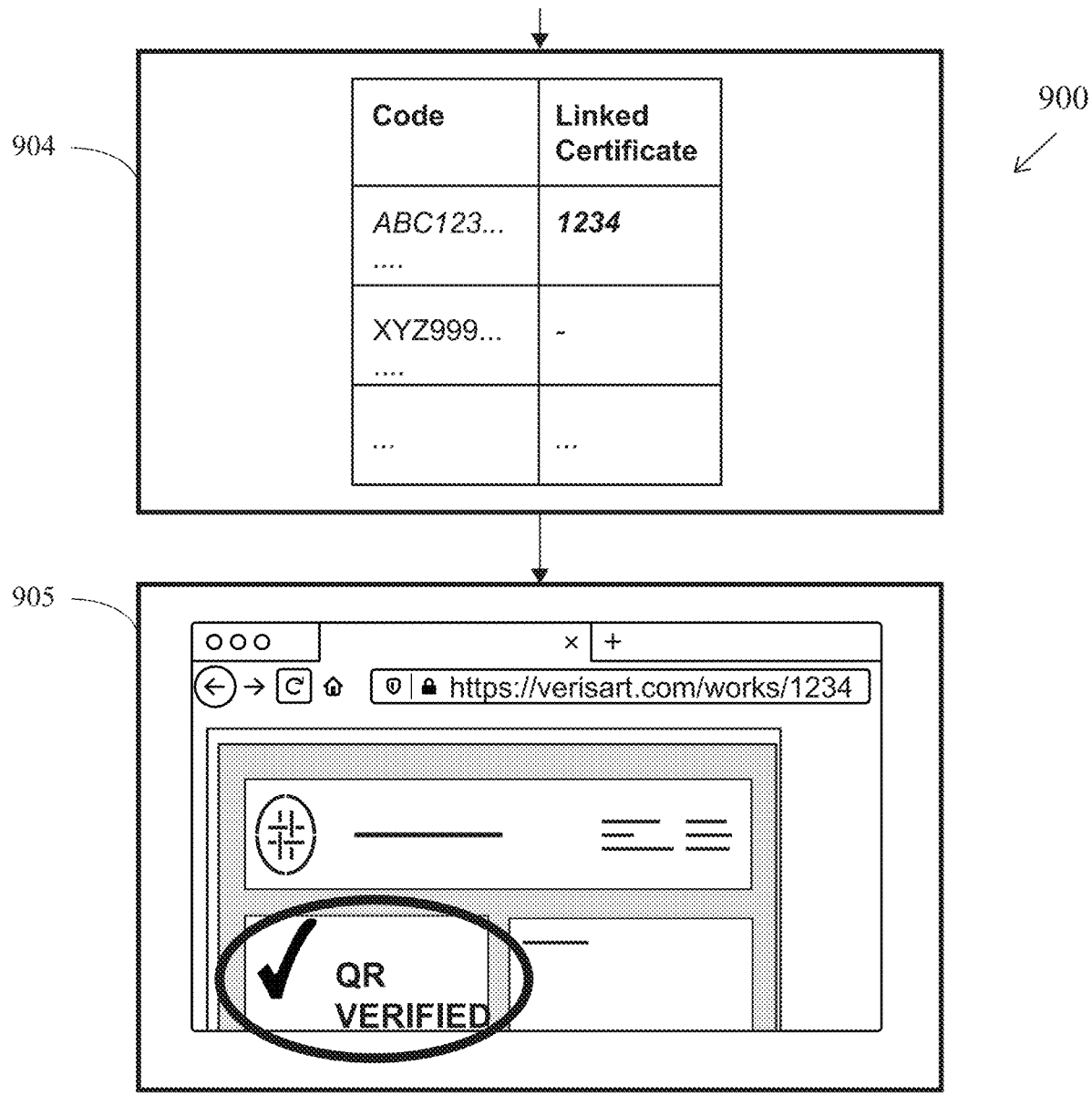
FIG. 9A is a continuation of the block diagram of FIG. 9 of the secure pre-printed process for QR codes for attachment to a collectible object.

FIGS. 9 and 9A show a block diagram of a secure pre-printed process 900 for QR codes for attachment to a collectible object. Under the pre-printed process, the QR codes are printed in bulk and pre-shipped to users, but they are not immediately active. At block 901, a large batch of random codes generated (not yet linked). At block 902, user receives a pack of QR codes. At block 903, the user scans a QR code. At block 904, a certificate is linked to the QR. At block 905, a third-party follows the QR and sees an extra security "tick."

In an alternative embodiment, there are child QR codes for the labels and stickers which are linked to a parent QR code on the digital COA.

In an alternative embodiment, the "Self Printed Secure" and "Bespoke" processes require an extra activation step: when the user gets the QR code, the user scans the QR code to prove receipt/download; and the QR code is not activated until this step is accomplished.

Figure 9B:
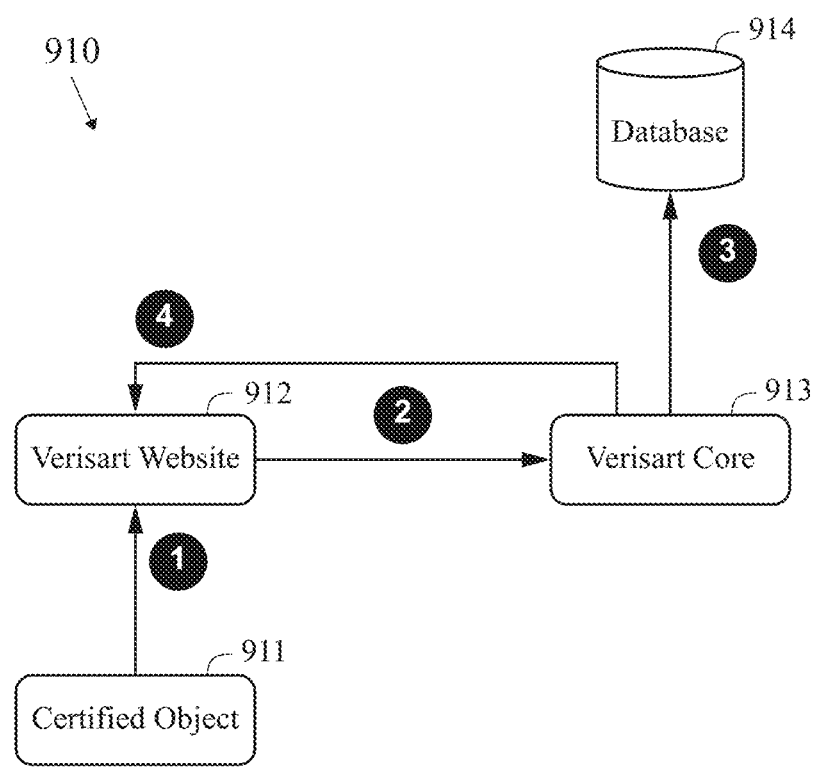
FIG. 9B is a block diagram of a QR code verification for a digital certification authentication system.

A QR code verification process 910 is shown in FIG. 9B. To verify a QR code, a third-party scans a QR code with an online certificate address and secure QR code for a certified collectible object 911. An authentication service website 912 sends the secure QR code for verification to an authentication server 913. The authentication server 913 verifies the secure QR code against a digital certificate residing at a database 914. The authentication server 913 then confirms verification of the online certificate on the authentication service website 912.

Figure 9C:
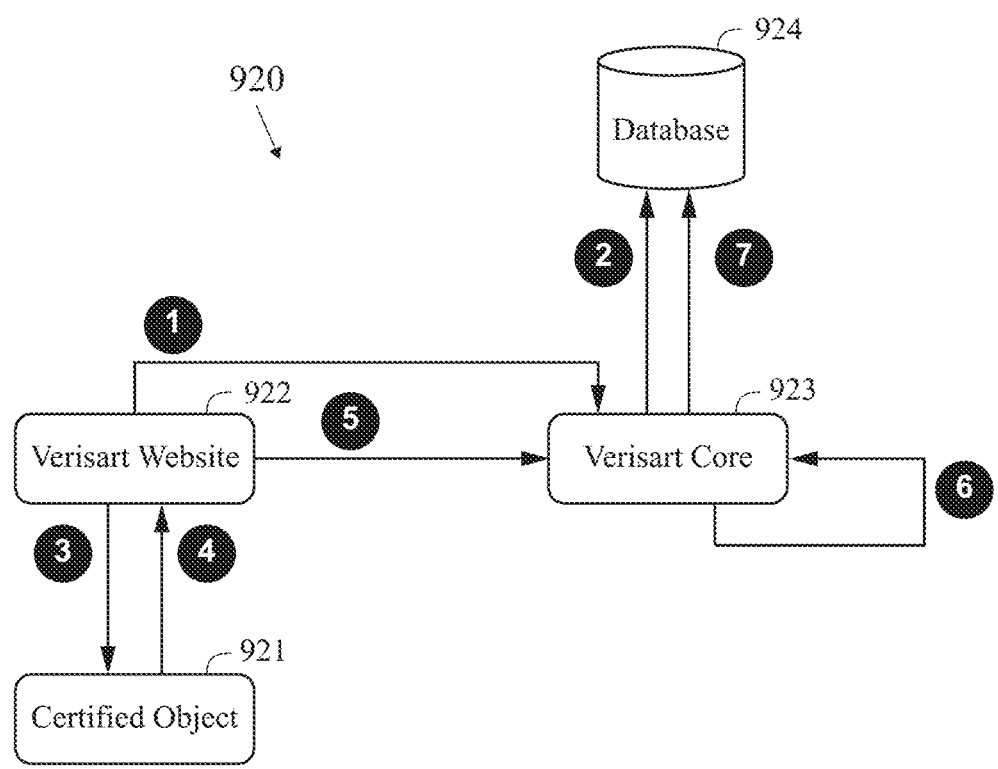
FIG. 9C is a block diagram of a QR code activation for a digital certification authentication system.

A QR code activation process 920 for a secure self-print approach is shown in FIG. 9C. On the authentication service website 922, a digital COA owner requests a QR code for download. The request is sent from the authentication service website 922 to an authentication server 923. The authentication server 923 accesses a database 924 and links the QR code with a digital COA. The owner prints and attaches the QR code to a collectible certified object 921. The owner preferably photographs the QR code attached to the collectible certified object 921 and uploads the image to the authentication service website 922, which transfers the image to the authentication server 923, thereby completing the activation. The QR code activation is then recorded by the authentication server 923 in the database 924.

Figure 9D:
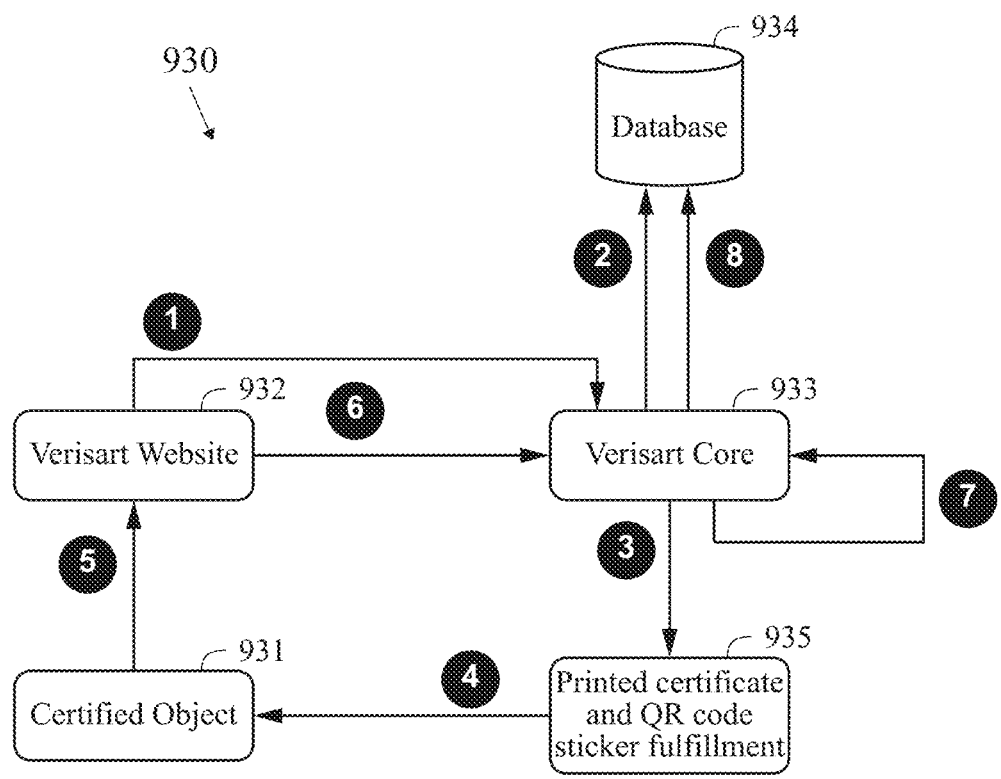
FIG. 9D is a block diagram of a QR code activation for a digital certification authentication system.

A QR code activation process 930 for a bespoke printed approach is shown in FIG. 9D. On the authentication service website 932, a digital COA owner requests a QR code for physical fulfillment. The request is sent from the authentication service website 932 to an authentication server 933. The authentication server 933 accesses a database 934 and links the QR code with a digital COA. The authentication server 933 dispatches the digital COA printing order to a printer 935 for fulfillment of the order. The printer ships the printed certificate and QR code sticker to the certificate owner for attachment to the certified collectible object 931. The owner preferably photographs the QR code attached to the collectible certified object 931 and uploads the image to the authentication service website 932, which transfers the image to the authentication server 933, thereby completing the activation. The QR code activation is then recorded by the authentication server 933 in the database 934.

Figure 9E:
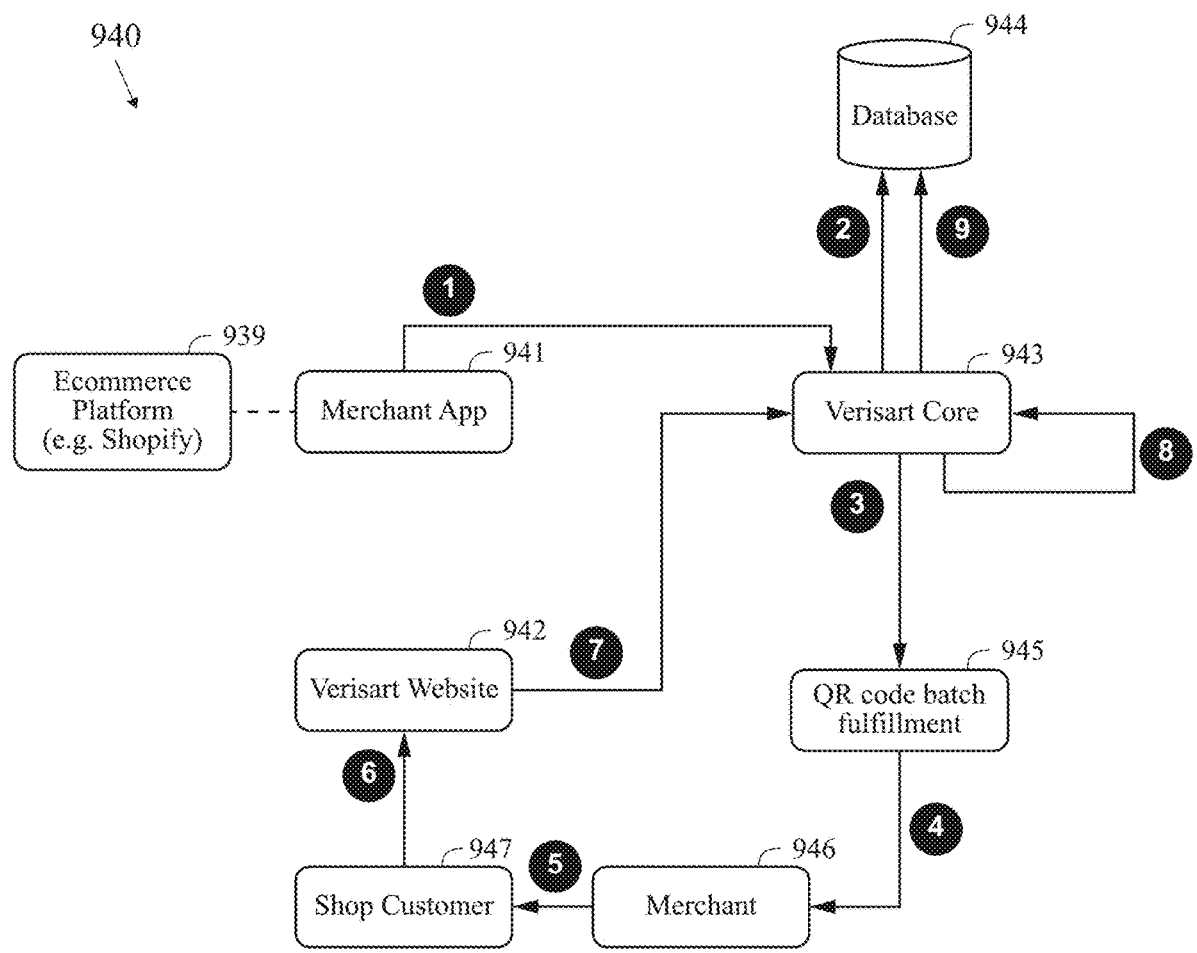
FIG. 9E is a block diagram of a QR code activation for a digital certification authentication system.

A QR code activation process 940 for a merchant printed approach is shown in FIG. 9E. From a merchant app 941 linked to an ecommerce platform 939, a merchant requests a batch of QR codes for physical fulfillment. The request is sent from the merchant app 941 to an authentication server 943. The authentication server 943 accesses a database 944 for the batch of QR codes for the merchant. The authentication server 943 dispatches the QR code batch order to a fulfillment site 945 for fulfillment of the order. The fulfillment site 945 sends the batch of QR codes to the merchant 946 who sends the QR codes and instructions for attachment to a certified collectible object to a shop customer 947. The customer preferably photographs the QR code attached to the collectible certified object and uploads the image to the authentication service website 942, which transfers the image to the authentication server 943, thereby completing the activation. The QR code activation is then recorded by the authentication server 943 in the database 944.

In one example of a secure self-print attack, an attacker copies the QR Code (the attacker photographs a QR and reprints it), which might allow the attacker to pass off forgeries of an artwork as real. To mitigate such an attack, the system allow a user to "deactivate" a QR in the database. The system also looks for suspicious activity in the server (e.g. QR scanned repeatedly from different IP addresses/geolocations). The system also adds supporting metadata for humans (e.g. last known address). The system also provides a proof of ownership step (e.g. genuine user proves ownership by logging into the authentication system and adding a temporary note to the certificate screen).

In another example of a secure self-print attack, there is a theft of a user account. In this example, the attacker can make new claims+QR codes of any collectible object. To mitigate such an attack, the system uses MFA on login. The system also re-requests authentication at a point of download. The system also allows a user to "deactivate" QR+certificate in the database. The system also looks for suspicious activity in the authentication server. The system also restricts the user to only artists the user is authorized to use.

Figure 10A:
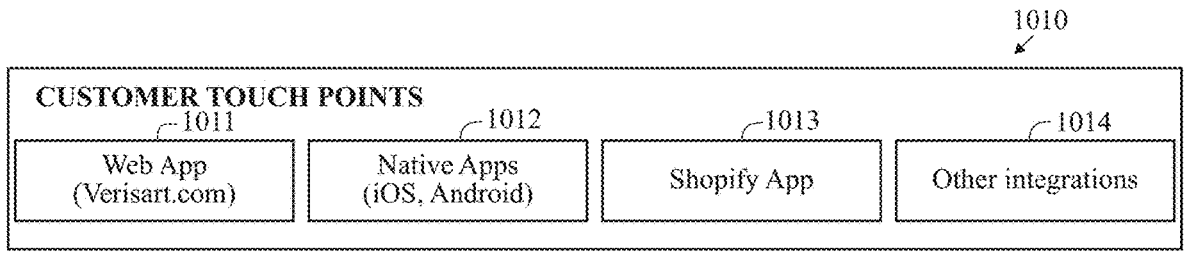
FIG. 10A is a block diagram of customer touch points.

FIG. 10A is a block diagram of customer touch points 1010 which preferably includes web apps 1011, native apps 1012, SHOPIFY apps 1013 and other integrations 1014.

Figure 10B:
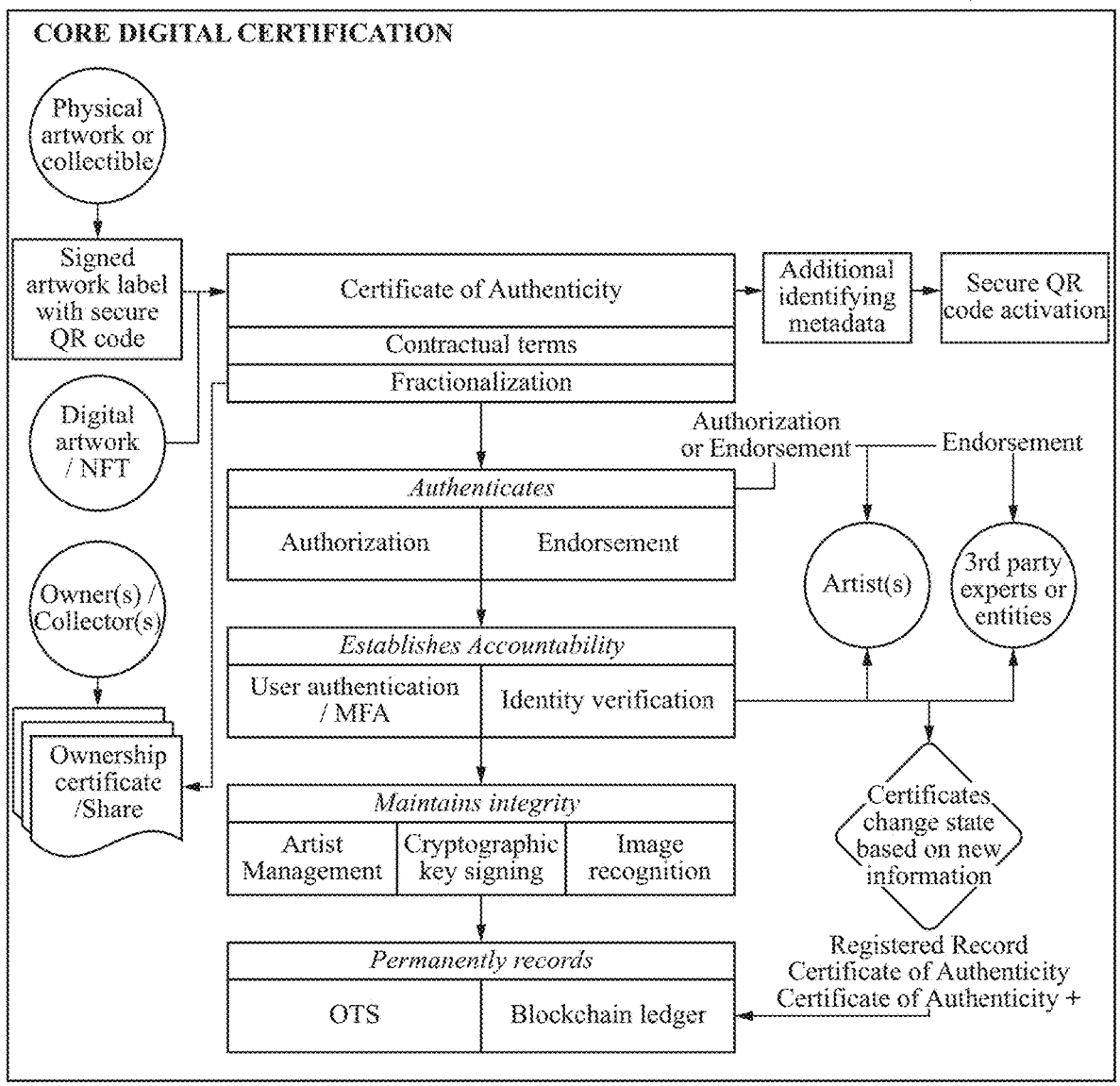
FIG. 10B is a block diagram of the core digital certification.

FIG. 10B is a block diagram of the core digital certification 1025.

Figure 10C:
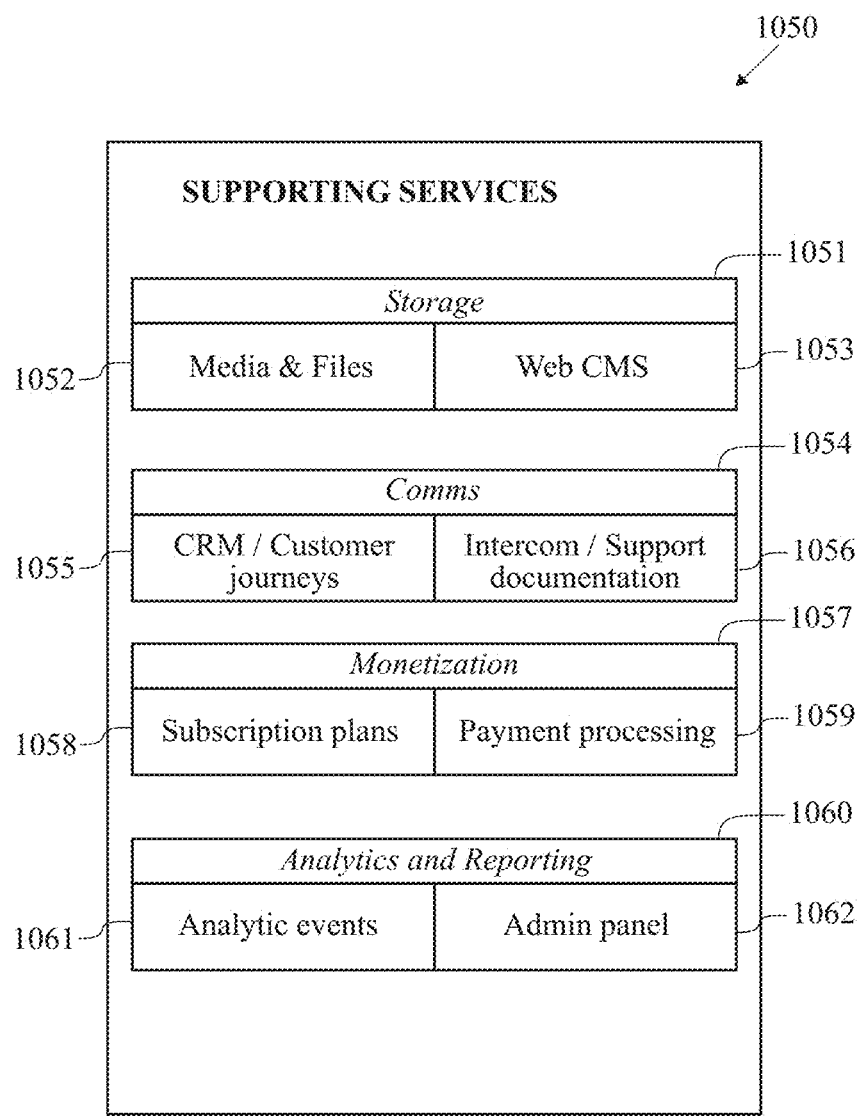
FIG. 10C is a block diagram of supporting services for the digital certification authentication system.

FIG. 10C is a block diagram of supporting services 1050 for the digital certification authentication system. The supporting services 1050 preferably includes storage 1051, communications 1054, monetization 1057 and analytics and reporting 1060. Storage 1051 preferably includes media and files 1052 and web CMS 1053. Communications 1054 preferably includes CRM/customer journeys 1055 and intercom/support documentation 1056. Monetization 1057 preferably includes subscription plans 1058 and payment processing 1059. Analytics and reporting 1060 preferably includes analytic events 1061 and an administration panel 1062.

Figure 11:
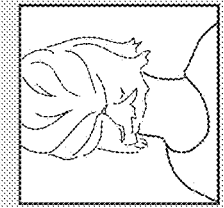
FIG. 11 is an illustration of a digital COA history.
Figure 11:
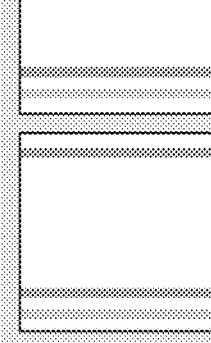
Figure 11:
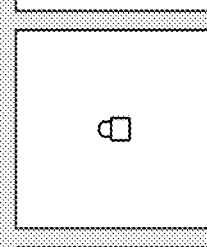
Figure 11:
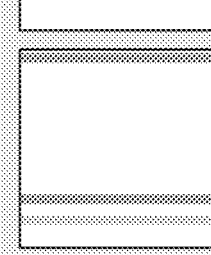
Figure 11:
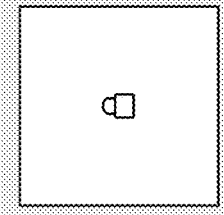
Figure 11A:
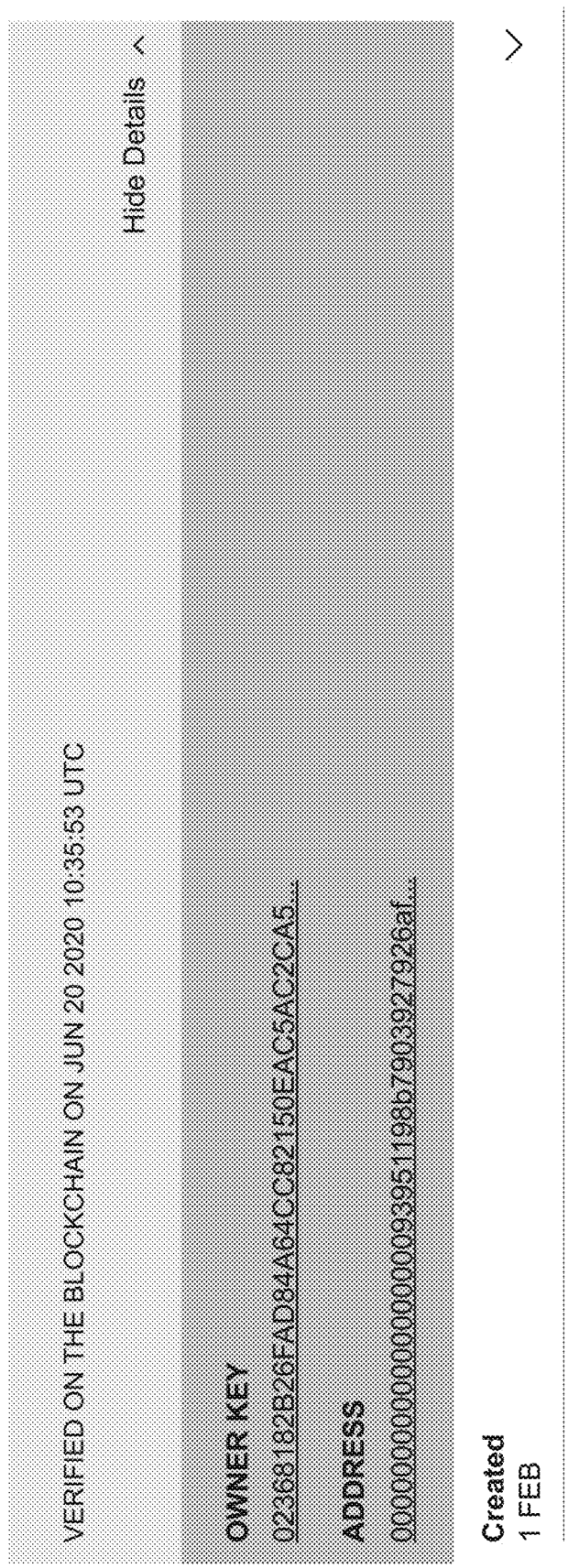
FIG. 11A is a continuation of the illustration of FIG. 11.

FIGS. 11 and 11A are an illustration of a digital COA history.

Figure 12:
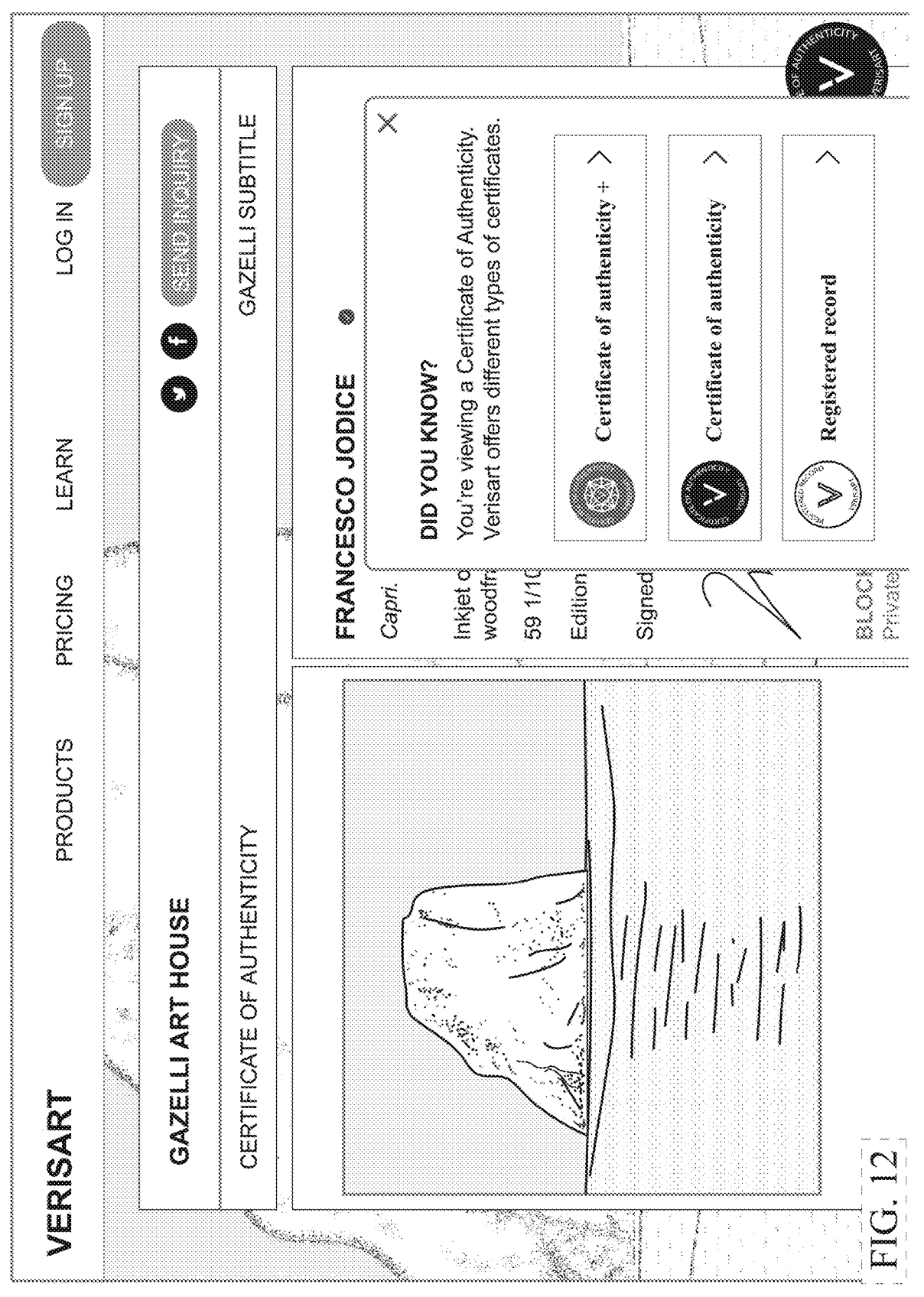
Figure 12A:
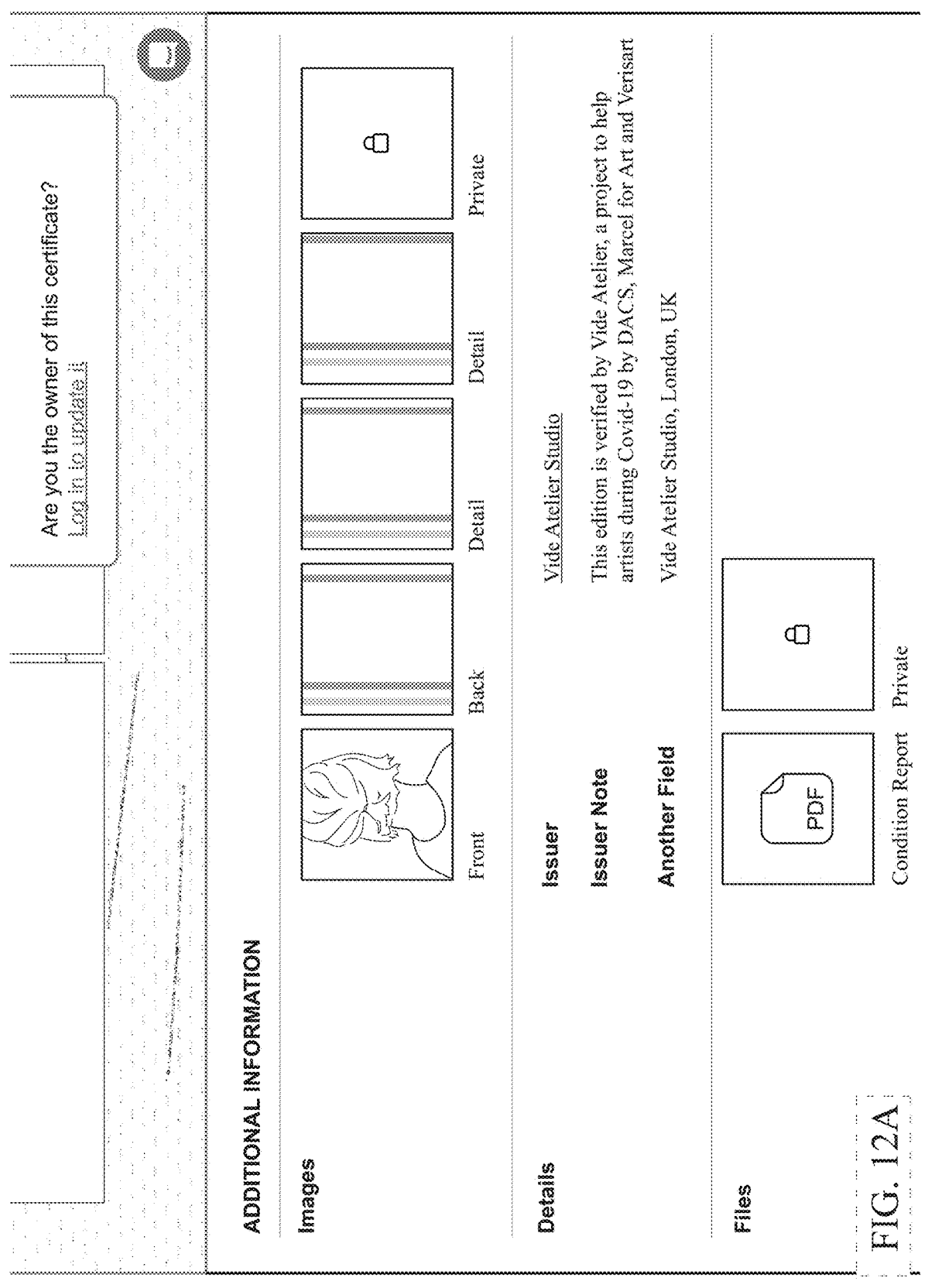
Figure 12B:
FIG. 12B is a continuation of the illustration of FIG. 12.
Figure 12B:

FIGS. 12, 12A and 12B are an illustration of a digital COA.

A core principle of the authentication system design is that authenticity is based on a collection of proofs, not a single factor. This is what underpins the idea that a certificate can change state along a continuum of low to high confidence in authenticity. Among the network of proofs that help determine authenticity or move a record along the continuum, some items have more weight than others. An artist's attestation that the artwork was made by them carries more weight than supporting images showing a detail of an artwork, but both are important. Taken together, along with other proofs, they determine where the certificate falls on the ladder of authenticity.

As stated, certain proofs carry more weight. They contribute crucial information about authenticity that is impossible to obtain or verify in any other way. The artist, creator, maker of the work, is unique in that they can say with greater certainty than anyone else, whether they created a work or not. The authentication system has two mechanisms for capturing an artist's attestations: Authorization and Endorsement.

Authorization refers to a relationship between two accounts in the system. The best example to illustrate this is a relationship between a gallery which represents the artist, and the artist themselves. The gallery can request authorization from an artist. If the artist approves the authorization, they acknowledge the representative relationship and permit the gallery to create COAs on their behalf. They attest that the gallery is a trustworthy party and will issue authentic and accurate certificates for their work. Here, the attestation by the artist for a specific work is indirect, but powerful, because the gallery can now create multiple authorized COAs for that artist. The authorization exists until it is revoked by the artist.

Endorsement refers to a relationship between a certificate and an account There are two types of endorsements: Artist endorsements and third-party endorsements. Artist endorsements carry more weight than third-party endorsements. The best example to illustrate this: A collector purchases or obtains an artwork and creates a record for it on authentication system. They send a request to the artist to acknowledge or endorse their artwork as having been created by them. The artist reviews and endorses the individual certificate (not the collector or their account) as authentic. Here, the attestation is direct, in that the artist is reviewing individual certificates of specific artworks. Third-party endorsements also increase confidence in authenticity, but they carry less weight than the artist's endorsement. The mechanism by which these endorsements are solicited and granted is the same: The certificate owner requests an endorsement and the third-party reviews and agrees to the endorsement. Examples of third-party endorsements include shippers who have packed and moved a work, gallerists or others who have exhibited the work, insurers who have indemnified the work, manufacturers of watches or jewelry, suppliers, conservators or others who have restored the work. The more endorsements, the further the work moves along the continuum.

A collector requests an endorser to endorse with the endorser's digital key but the collector does not generate the digital key for the endorser. The endorser creates the digital key on behalf of the collector/owner of the digital COA. The collector could also be an auction house or insurer.

Figure 13:
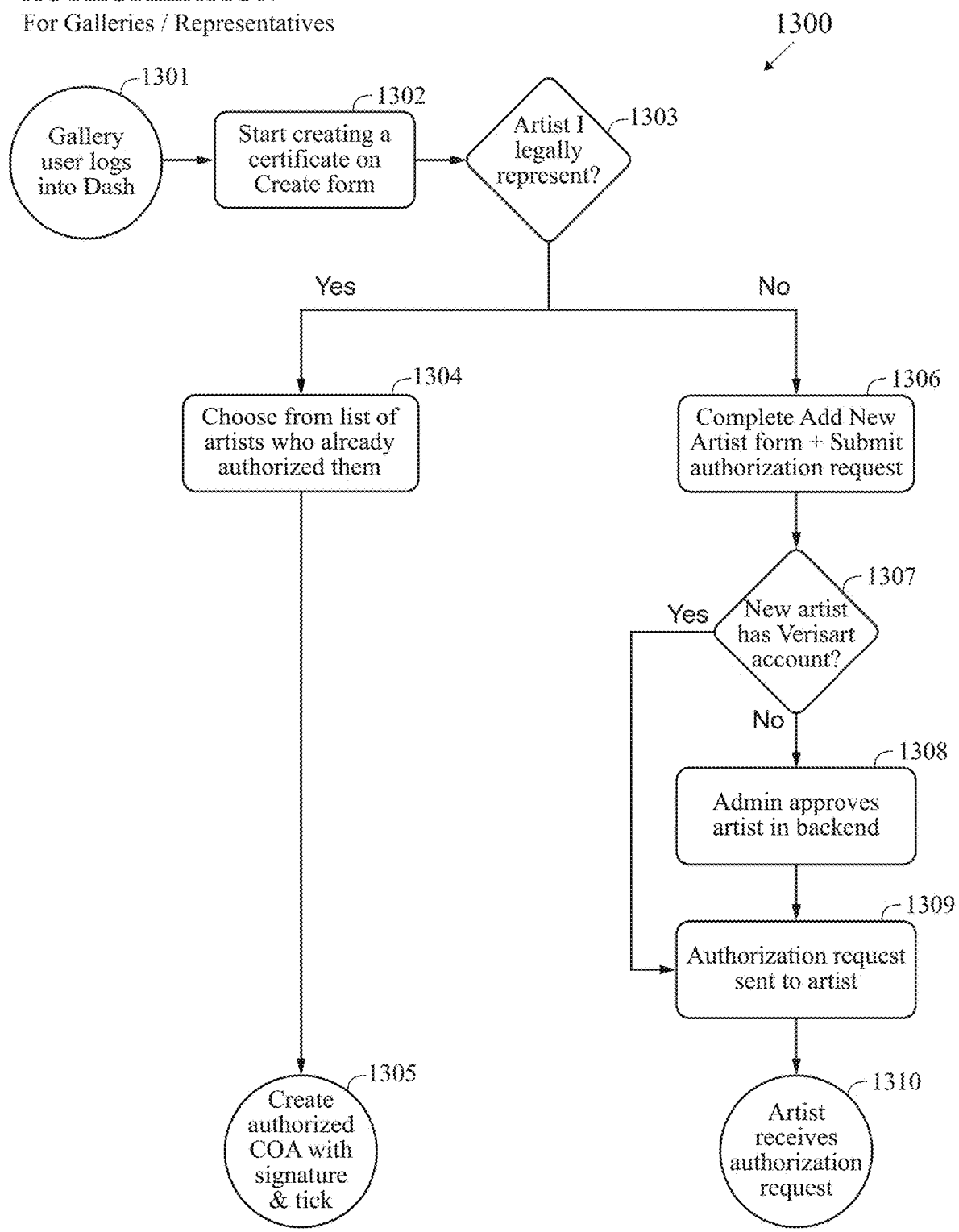
FIG. 13 is a flow chart of a process for authorization for galleries/representatives.

FIG. 13 is a flow chart of a process 1300 for authorization for galleries/representatives. At 1301, a gallery user logs into a dashboard of an authentication system. At 1302, the user starts creating a certificate on a Create form of the authentication system. At 1303, an inquiry if the artist is legally represented determines the Yes path or the No path. If Yes, at 1304, the user chooses from a list of artists who have already authorized the user. At 1305, the user creates an authorized COA with a signature and tick. If No, at 1306, the user completes an Add New Artist form and submits an authorization request. At 1307, an inquiry if the new artist has an account with the authentication service. If Yes, at 1309, an authorization request is sent to the artist. If No, at 1308, the administration approves the artist. Then, at 1309, an authorization request is sent to the artist. At 1310, the artist receives the authorization request for the user.

Figure 13A:
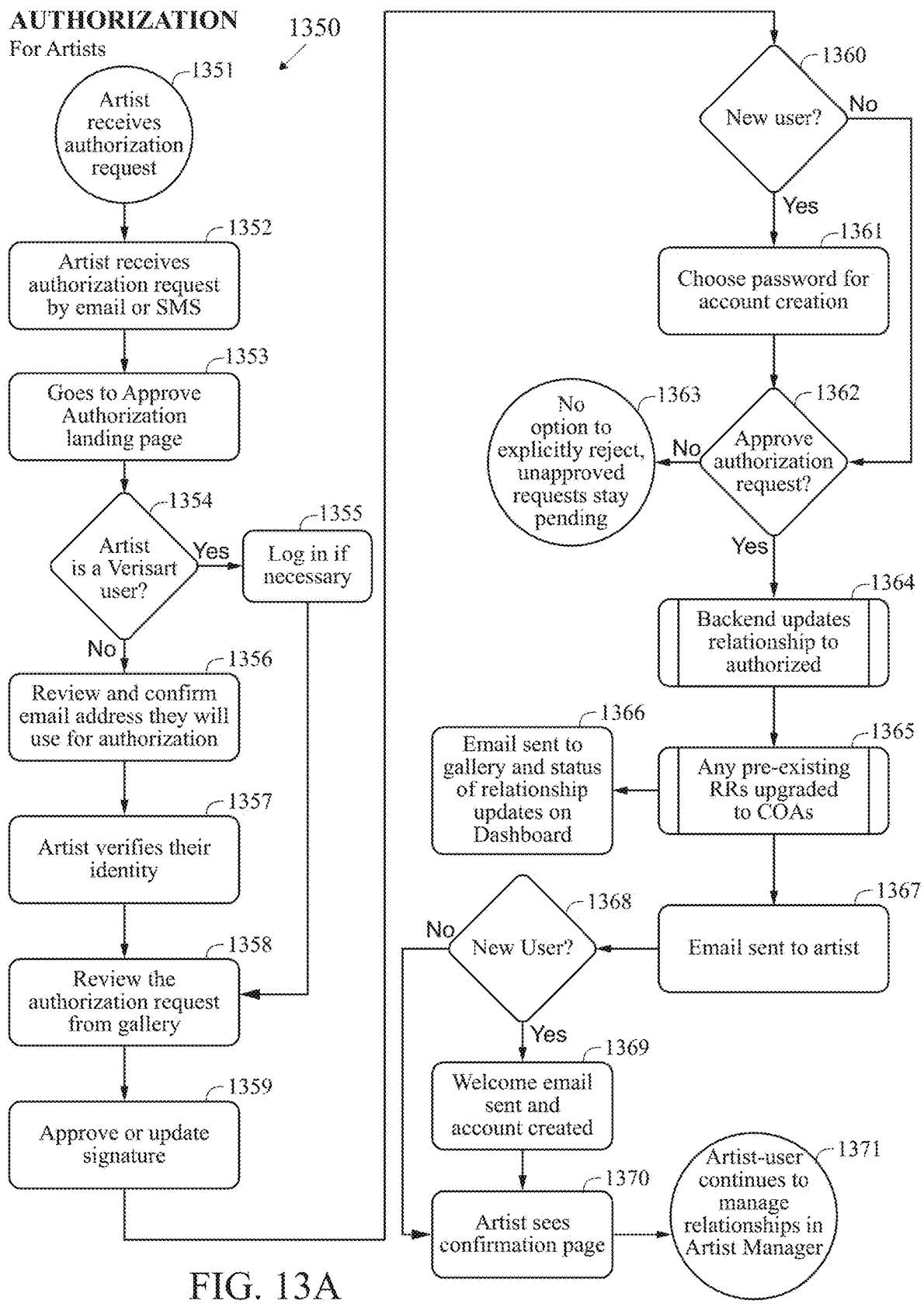
FIG. 13A is a flow chart of a process for authorization for artists.

FIG. 13A is a flow chart of a process 1350 for authorization for artists. At 1351, the artist receives an authorization request. At 1352, the artist receives the authorization request by email, SMS or other communications channel. At 1353, the artist accesses the Approve Authorization landing page at an authentication service site. At 1354, an inquiry if the artist is a current user of the authentication service. If Yes, at 1355, the artist logins to an account, and at 1358 the artist reviews the authorization request from a gallery. If No, at 1356, the artist reviews and confirms an email address used for authorization. At 1357, the artist verifies their identity. At 1358, the artist reviews the authorization request from a gallery. At 1359, the artist approves or updates a signature. At 1360, an inquiry if the user is new. If Yes, at 1361, the artist selects a password for account creation. After 1361 and if No, an inquiry to approve the authorization request. If No, at 1363, there is an option to reject or stay the request. If Yes, at 1364, the authentication service updates the relationship to authorized. At 1365, any pre-existing registered records are upgraded to digital COAs. At 1367, an email is sent to the artist. An inquiry at 1368 if a new user. If Yes, a welcome email is sent at 1369 and an account is created. If No, the artist sees the confirmation page at 1370. At 1371, the artist-user continues to manage the relationships in Artist Manager.

Figure 16:
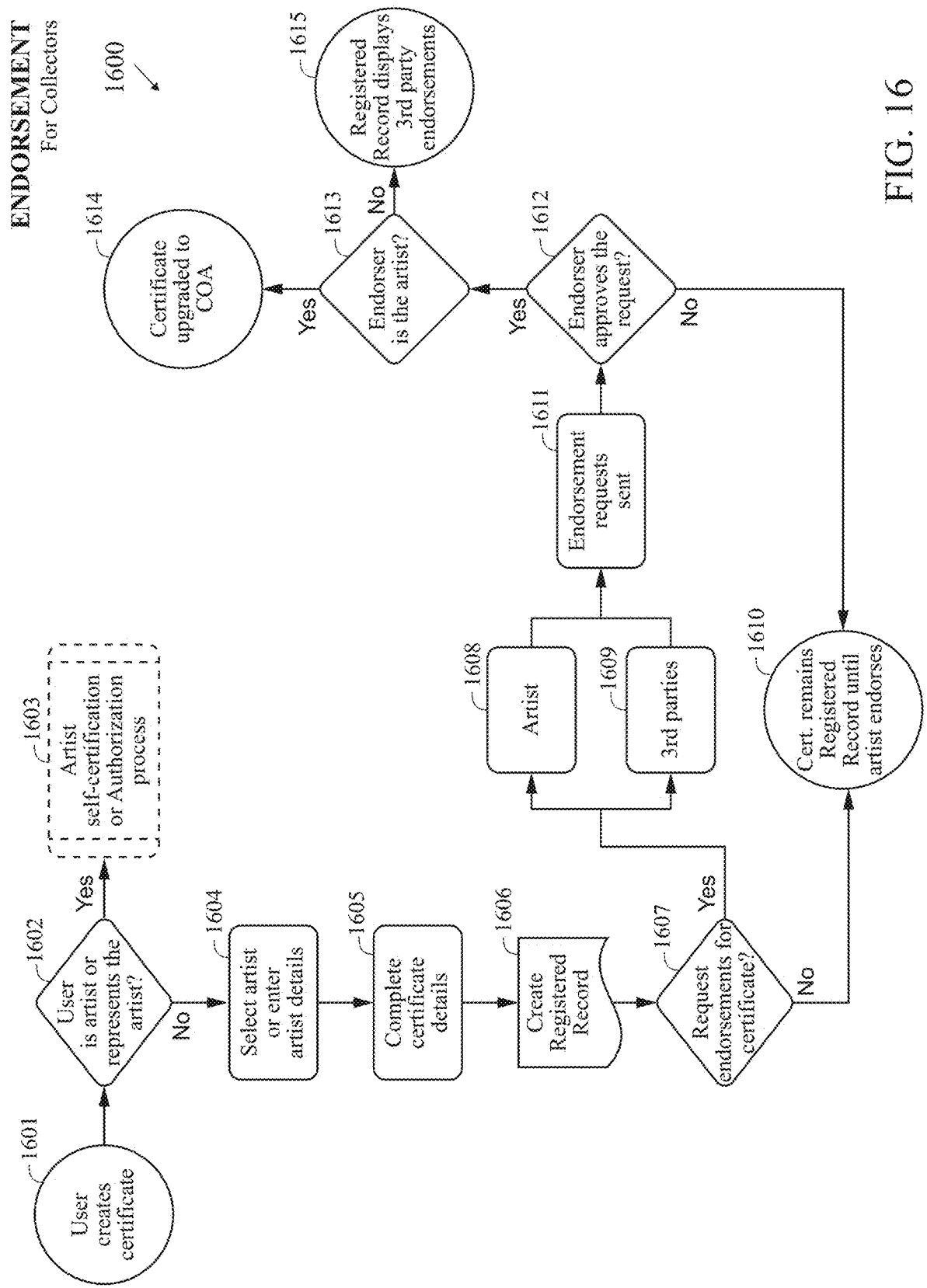
FIG. 16 is a flow chart of a process for endorsement for collectors.

FIG. 16 is a flow chart of a process 1600 for endorsement for collectors. At 1601, a user (collector) creates a certificate. At 1602, an inquiry if the user is an artist or represents and artist. If Yes, at 1603, then artist self-certification or authorization process is initiated. If No, at 1604, the user selects the artist or enters the artist details. At 1605, the user completes the certificate details. At 1606, the user creates a registered record. At 1607, an inquiry if the request is for endorsements for the certificate. If Yes, at 1608, an endorsement request for an artist or at 1609 an endorsement request for a third-party, is sent at 1611. If No, at 1610 the certificate remains a registered record until there is an artist endorsement. At 1612, an inquiry if the endorser approves the request. If No, it ends. If yes, at 1613, an inquiry if the endorser is an artist. If Yes, the certificate is upgraded to a digital COA. If No, the registered record displays the third-arty endorsement.

Figure 17:
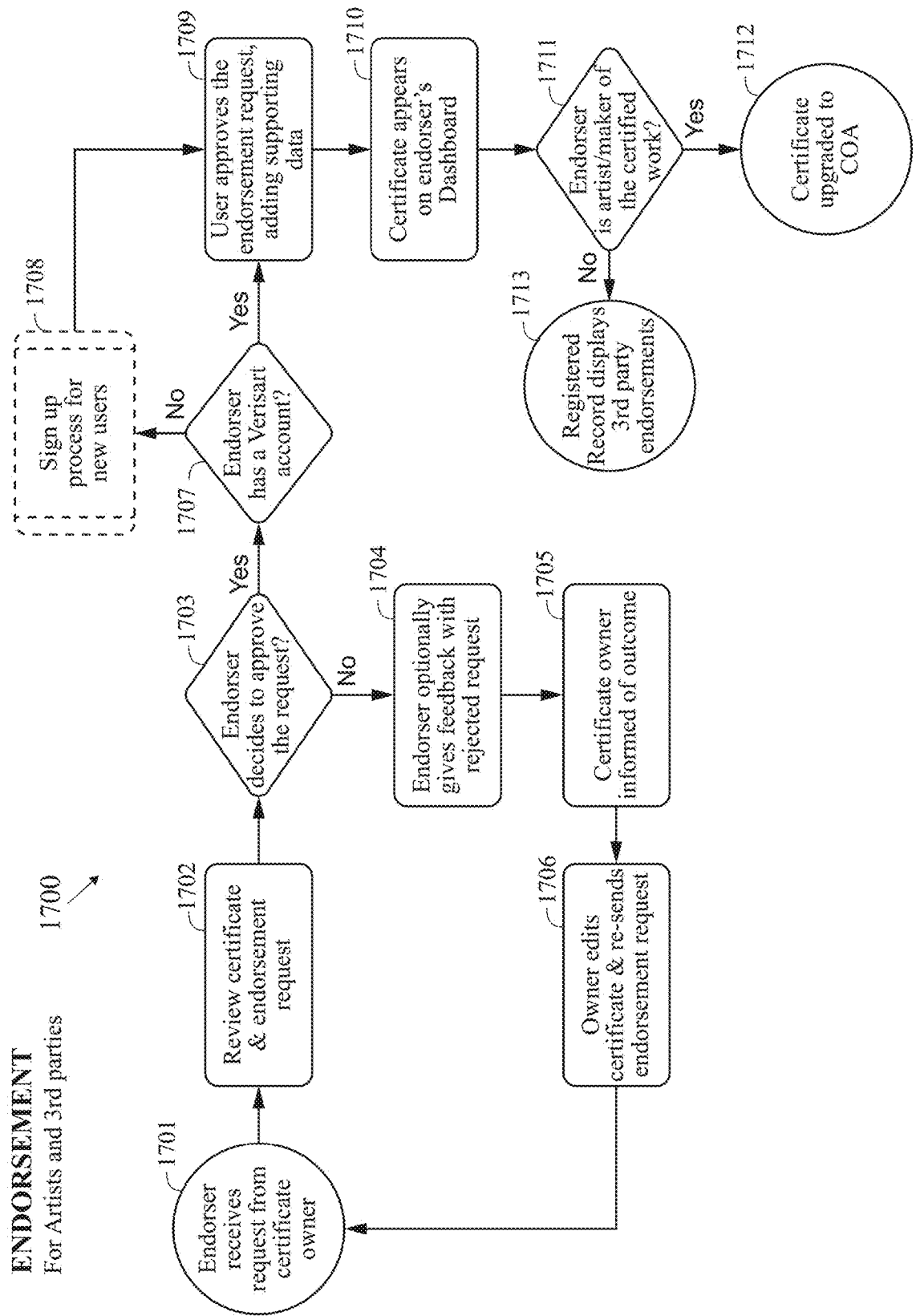
FIG. 17 is a flow chart of a process for endorsement for artist and third-parties.

FIG. 17 is a flow chart of a process 1700 for endorsement for artist and third-parties. At 1701, an endorser receives a request from a certificate owner. At 1702, the endorser reviews the certificate and endorsement request. At 1703, an inquiry if the endorser decides to approve the request. If No, at 1704, the endorser optionally provides feedback with the rejected request. At 1705, the certificate owner is informed of the rejected request. At 1706, the certificate owner edits and re-sends the endorsement request. If Yes, at 1707, an inquiry if the endorser has an account with the authentication service. If No, at 1708, the endorser proceed with a sign-up process for a new user. If Yes, at 1709, the endorser approves the endorsement request, and adds supporting data. At 1710, the certificate appears on the dashboard of the endorser's account at the authentication service. At 1711, an inquiry if the endorser is a creator of the certified collectible object. If Yes, the certificate is upgraded to a digital COA. If No, the registered record displays the third-party endorsement.

Figure 14:
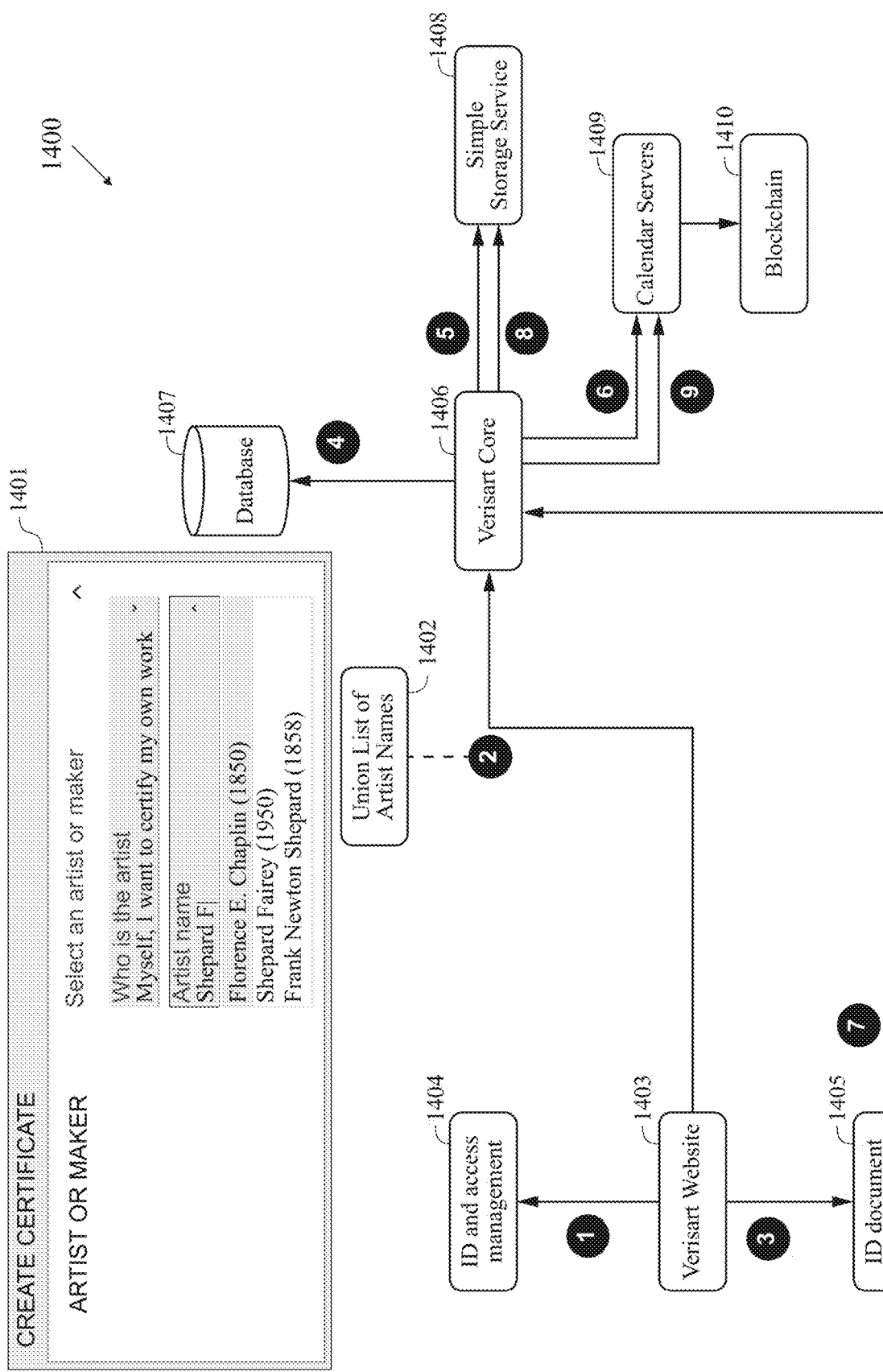
FIG. 14 is a block diagram of a digital certification authentication system.

A preferred embodiment of a digital certification authentication system 1400 is shown in FIG. 14. On an authentication web site 1403, a user creates a new account and the details of the account are preferably stored on a directory storage site 1404 such as COGNITO. The user searches for an artist record associated with their account and the user provides certificate metadata. Artist search results can be augmented by sites such as ULAN 1402 and an artist may have created a certificate 1401 for a work of art. The user uploads documentation to the authentication service website 1403, and the identity document verification 1405 is transmitted to an authentication server 1406. The result of the identity verification is returned to support automated approval. If the automated approval fails, the authentication service administration is notified. The artist record and signing digital keys are created in an authentication service database 1407. The authentication server 1406 creates a registered record archive and upload it to a storage site 1408. The authentication server 1406 transmits the registered record hash for digital ledger (blockchain) attestation at a time stamp site 1409 (such as Open Timestamps) and then to a digital ledger site (such as BITCOIN blockchain) 1410. Once the registered record is upgraded to a digital COA (as discussed above), a digital COA hash is sent for digital ledger attestation at the time stamp site 1409 and then to the digital ledger site 1410.

Figure 15:
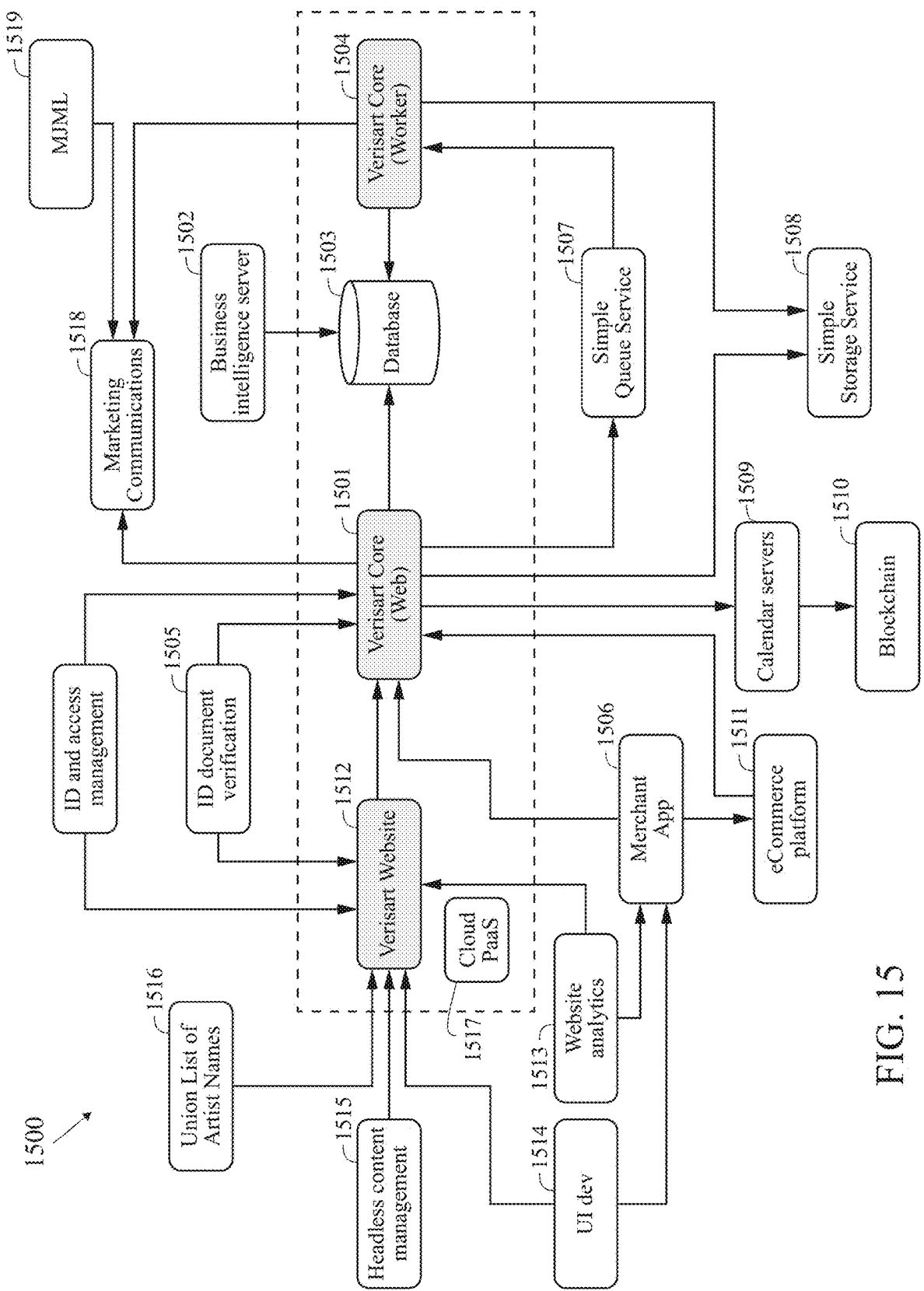
FIG. 15 is a block diagram of a digital certification authentication system.

An alternative embodiment of a digital certification authentication system 1500 is shown in FIG. 15. An authentication server 1501 is the central control of the system 1500. A metabase 1502 allows for ad-hoc queries against an authentication service database 1503 to find trends and other business intelligence from the digital COAs. It is preferably hosted on the cloud. The authentication service database 1503 preferably contains artist certificate digital signing keys, along with historical keys that can be re-used for validation at a later time. An authentication service worker site retrieves detached timestamp files to check if a hash committed to a digital ledger (blockchain). A storage site 1508 stores signed certificate version files along with the detached timestamp. A queue service site 1507 handles edition creation projects. The authentication server 1501 transmits the registered record hash for a digital ledger (blockchain) attestation at a time stamp site 1509 (such as Open Timestamps) and then to a digital ledger site (such as BITCOIN blockchain) 1510. On an authentication website 1512, a user creates a new account and the details of the account are preferably stored on a directory storage site 1520 such as COGNITO. The user searches for an artist record associated with their account and the user provides certificate metadata. Artist search results can be augmented by sites such as ULAN 1516. A marketing site 1515, such as CONTENTFUL, manages static marketing content for the authentication service website 1512. An identity document verification site 1505 verifies identity documents. A marketing manager site 1518 sends customer notifications and marketing via email, and manages marketing preferences. An email creation site 1519 provides a framework for email template creation. Other sites include a website analytics site 1513, a merchant app site 1506, an Ecommerce site (such as SHOPIFY) 1511, a developer UI component site 1514 and a cloud application platform site (such as HEROKU) 1517.

Figure 18:
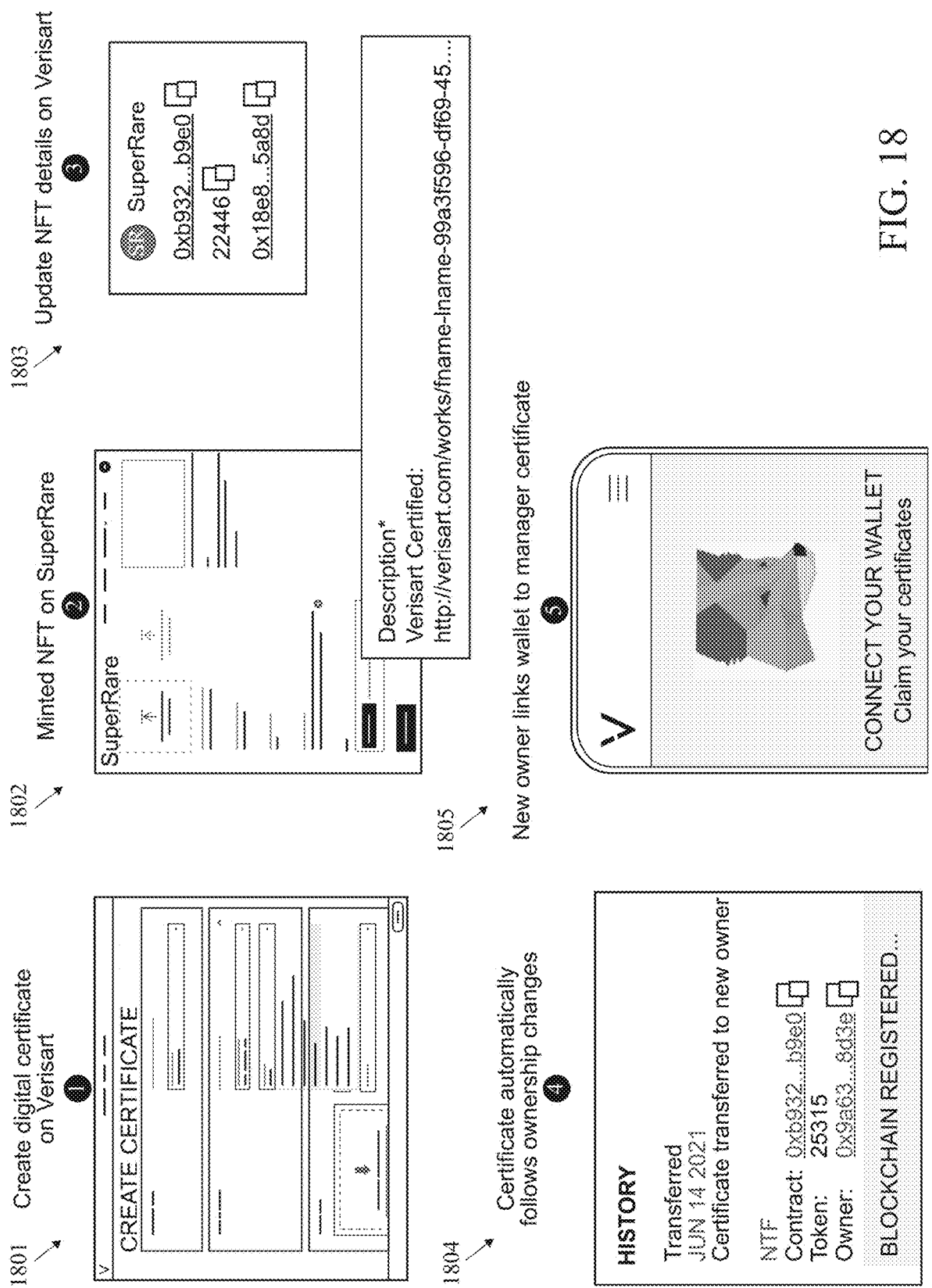
FIG. 18 is a block diagram of a of a digital certification authentication system for a NFT.

FIG. 18 is a block diagram of a of a digital certification authentication system for a NFT. At step 1801, a digital certificate is created at an authentication server. At block 1802, an NFT is minted on a SuperRare software engine. At block 1803, the details of the NFT are updated at the authentication server. At block 1805, a certificate automatically follows the ownership changes of the NFT. At block 1806, a new owner links a digital wallet to a manager certificate.

Figure 19:
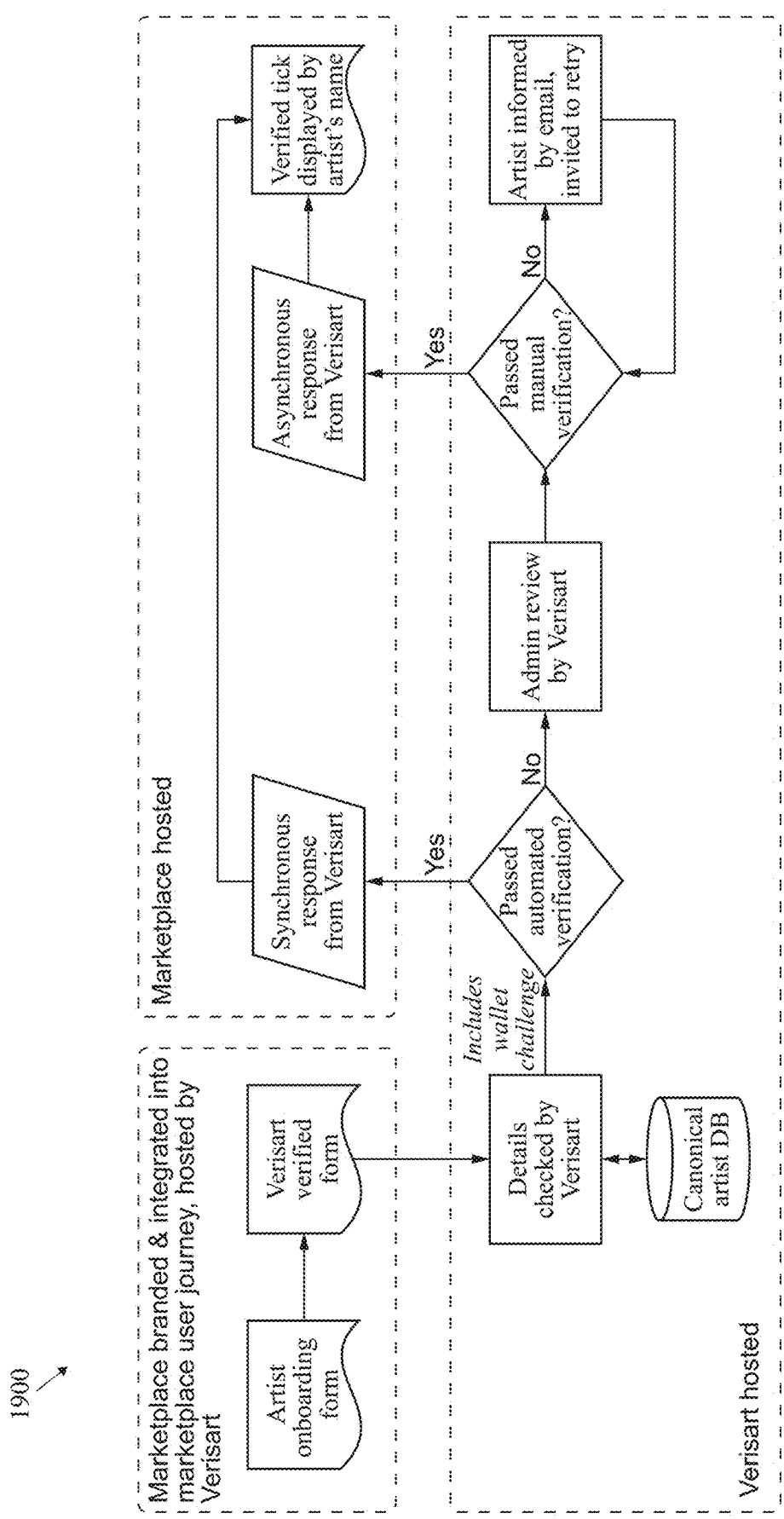
FIG. 19 is a flow chart for a process for an artist verification for a NFT.

FIG. 19 is a flow chart for a process 1900 for an artist verification for a NFT.

Figure 20:
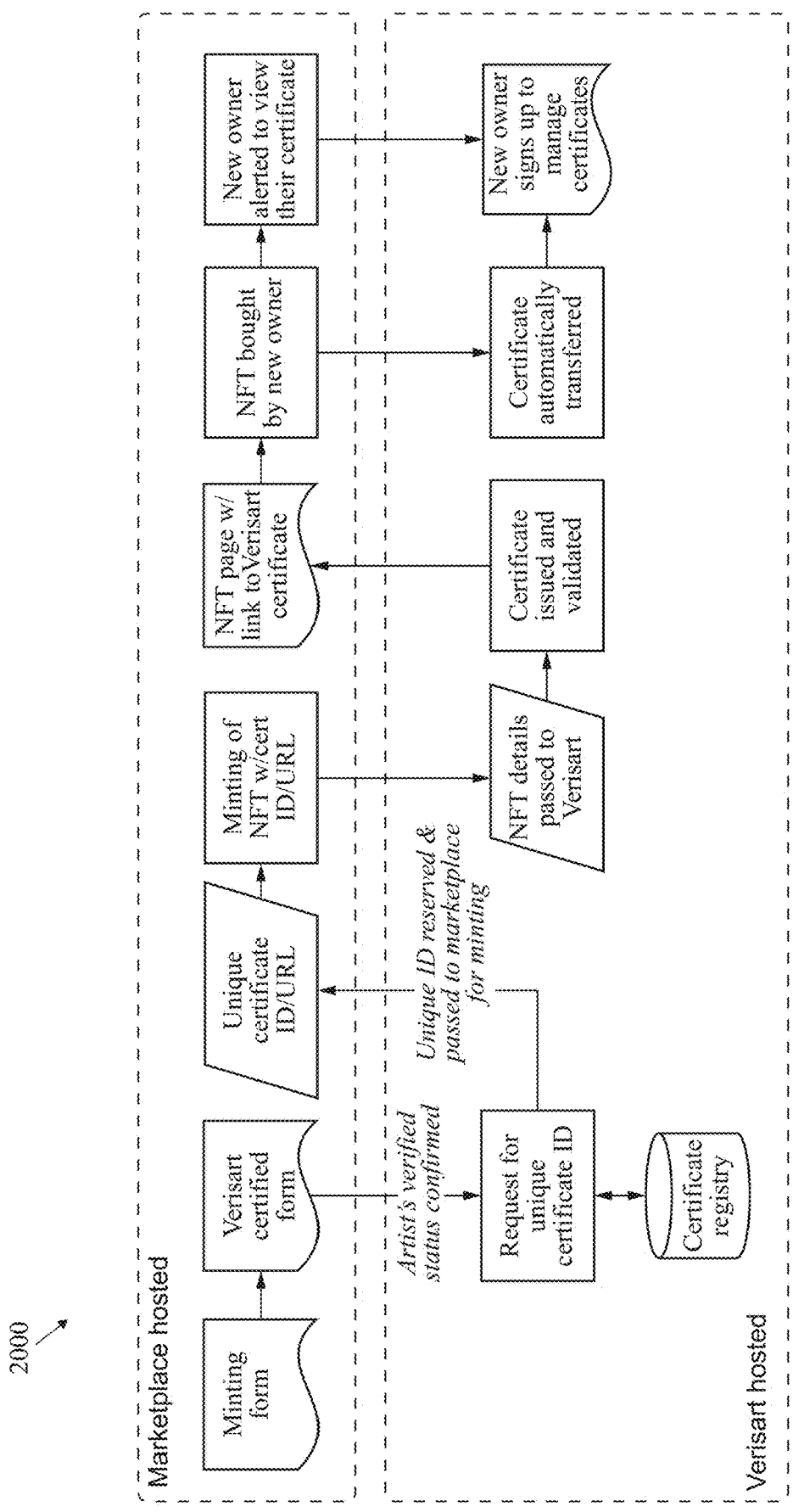
FIG. 20 is a flow chart for a process for an artist certification for a NFT.

FIG. 20 is a flow chart for a process 2000 for an artist certification for a NFT.

An operating system controls the execution of other computer programs, running of the PSO platform, and provides scheduling, input-output control, file and data management, memory management, and communication control and related services. The operating system may be, for example WINDOWS (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), APPLE OS X, iOs and variants thereof (available from Apple, Inc. of Cupertino, Calif.), or the like.

The method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the Present Invention is preferably written in an object oriented, scripted or unscripted programming language such as C++, C#, SQL, Java, Python, Javascript, Typescript, PHP, Ruby, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/ software.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for creating a digital certificate and/or a digital certificate of authenticity (COA) for a non-fungible token (NFT), the method comprising:
   a) transmitting from a server to a user a digital key;
   b) receiving a request from a user for a relationship with a creator of a NFT;
   c) establishing a registered record for the NFT;
   d) authorizing a relationship between the user and the creator subsequent to verification of the user;
   e) generating a creator relationship digital key at the server; and
   f) converting the registered record to a digital COA with a confirmation using the creator relationship digital key;
   wherein the digital COA is based upon a plurality of authentication endorsements and is configured to change state along a continuum of low to high confidence in authenticity based on the plurality of authentication endorsements; wherein each of the plurality of authentication endorsements are weighted differently, and an authentication endorsement from the creator of the NFT is weighted greater than an authentication endorsement from a third-party.

2. The method according to claim 1 further comprising: g) creating a random one-time code at the server; h) generating a secure computer readable code comprising the random one-time code, for attachment of the computer readable code to the NFT; and i) linking the random one-time code in a database to the digital COA.

3. The method according to claim 1 further comprising: g) transferring the digital COA to a new owner of the NFT by generating a new digital key for the new owner on the digital COA.

4. The method according to claim 1 further comprising: g) generating an endorsement for a certificate by generating an endorsement digital key, an endorser approving the endorsement key for inclusion in the digital COA, and noting a time stamp of the endorser.

5. The method according to claim 2 wherein the computer readable code is self-printed, merchant printed, bespoke printed or integrated into a substance of the NFT.

6. The method according to claim 1 wherein the digital COA comprises a plurality of digitally enforceable contract terms.

7. The method according to claim 1 further comprising:
   g) receiving a request from a user for a relationship with a third-party of the NFT;
   h) authorizing a relationship between the user and the third-party;
   i) generating an endorsement digital key at the server; and
   j) modifying the digital COA with an inclusion of the endorsement digital key.

8. The method according to claim 1 further comprising: g) storing a version of the digital COA in a distributed ledger comprising a timestamp and a signed attestation.

9. The method according to claim 8 further comprising: h) verifying the digital COA by examining the distributed ledger to verify the timestamp; i) verifying cryptographic signatures of the owner and the creator against public keys at a remote site; and j) cryptographically verifying contents of metadata and files of the digital COA by comparing a plurality of hashes against a main manifest file.

10. The method according to claim 2 wherein the secure computer readable code is an active link between the NFT and the digital COA.

11. The method according to claim 2 wherein the secure computer readable code is at least one of a QR code or metadata on a digital file.

12. A non-transitory computer-readable medium that stores a program that causes a processor to generate a digital certificate of authenticity (COA) for a non-fungible token (NFT) by executing the following steps:
   a) transmitting from a server to a user a digital key;
   b) receiving a request from a user for a relationship with a creator of a NFT;
   c) establishing a registered record for the NFT;
   d) authorizing a relationship between the user and the creator subsequent to verification of the user;

e) generating a creator relationship digital key at the server; and
f) converting the registered record to a digital COA with a confirmation using the creator relationship digital key;
wherein the digital COA is based upon a plurality of authentication endorsements and is configured to change state along a continuum of low to high confidence in authenticity based on the plurality of authentication endorsements;
wherein each of the plurality of authentication endorsements are weighted differently, and an authentication endorsement from the creator of the NFT is weighted greater than an authentication endorsement from a third-party.

13. The non-transitory computer readable medium according to claim 12 further comprising: g) creating a random one-time code at the server; h) generating a secure computer readable code comprising the random one-time code, for attachment of the computer readable code to the NFT; and i) linking the random one-time code in a database to the digital COA.

14. The non-transitory computer readable medium according to claim 12 further comprising: g) generating an endorsement for a certificate by generating an endorsement digital key, and an endorser approving the endorsement key for inclusion in the digital COA, and noting a geolocation and a time stamp of the endorser.

15. The non-transitory computer readable medium according to claim 12 further comprising:
  g) receiving a request from a user for a relationship with a third-party of the NFT;
  h) authorizing a relationship between the user and the third-party;
  i) generating an endorsement digital key at the server; and
  j) modifying the digital COA with an inclusion of the endorsement digital key.

16. The non-transitory computer readable medium according to claim 12 further comprising: g) storing a version of the digital COA in a distributed ledger comprising a timestamp and a signed attestation.

17. The non-transitory computer readable medium according to claim 16 further comprising: h) verifying the digital COA by examining the distributed ledger to verify the timestamp; i) verifying cryptographic signatures of the owner and the creator against public keys at a remote site; and j) cryptographically verifying contents of metadata and files of the digital COA by comparing a plurality of hashes against a main manifest file.

18. A digital certificate of authenticity (COA) for a non-fungible token (NFT) comprising:
  a verified user's digital key for a user;
  a creator's relationship digital key confirming a relationship between the user and a creator for the NFT;
  a completeness of collectible information comprising an image; and
  an active link between the digital COA and the NFT;
  wherein the digital COA is based upon a plurality of authentication endorsements and is configured to change state along a continuum of low to high confidence in authenticity based on the plurality of authentication endorsements;
  wherein each of the plurality of authentication endorsements are weighted differently, and an authentication endorsement from the creator of the NFT is weighted greater than an authentication endorsement from a third-party.

* * * * *